United States Patent
Swartzentruber et al.

(10) Patent No.: US 9,584,637 B2
(45) Date of Patent: Feb. 28, 2017

(54) GUARANTEED IN-ORDER PACKET DELIVERY

(71) Applicant: Netronome Systems, Inc., Santa Clara, CA (US)

(72) Inventors: Ron Lamar Swartzentruber, Amesbury, MA (US); Steven W. Zagorianakos, Brookline, NH (US); Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 114 days.

(21) Appl. No.: 14/184,455

(22) Filed: Feb. 19, 2014

(65) Prior Publication Data

US 2015/0237180 A1 Aug. 20, 2015

(51) Int. Cl.
| | |
|---|---|
| H04L 12/879 | (2013.01) |
| H04L 29/08 | (2006.01) |
| H04L 12/801 | (2013.01) |
| H04L 12/863 | (2013.01) |
| H04L 29/06 | (2006.01) |
| H04L 12/861 | (2013.01) |

(52) U.S. Cl.
CPC ............ *H04L 69/324* (2013.01); *H04L 47/34* (2013.01); *H04L 47/50* (2013.01); *H04L 49/901* (2013.01); *H04L 49/9057* (2013.01); *H04L 69/22* (2013.01)

(58) Field of Classification Search
CPC ..... H04L 1/1841; H04L 1/1848; H04L 49/00; H04L 49/9084; H04W 24/10
See application file for complete search history.

(56) References Cited

U.S. PATENT DOCUMENTS

| | | | |
|---|---|---|---|
| 2002/0087732 A1* | 7/2002 | Boucher | G06F 5/10 |
| | | | 709/250 |
| 2003/0108045 A1* | 6/2003 | Jayam | F04D 29/384 |
| | | | 370/394 |

* cited by examiner

*Primary Examiner* — Faruk Hamza
*Assistant Examiner* — Aixa Guadalupe-Cruz
(74) *Attorney, Agent, or Firm* — Imperium Patent Works LLP; T. Lester Wallace; Mark D. Marrello

(57) ABSTRACT

Circuitry to provide in-order packet delivery. A packet descriptor including a sequence number is received. It is determined in which of three ranges the sequence number resides. Depending, at least in part, on the range in which the sequence number resides it is determined if the packet descriptor is to be communicated to a scheduler which causes an associated packet to be transmitted. If the sequence number resides in a first "flush" range, all associated packet descriptors are output. If the sequence number resides in a second "send" range, only the received packet descriptor is output. If the sequence number resides in a third "store and reorder" range and the sequence number is the next in-order sequence number the packet descriptor is output; if the sequence number is not the next in-order sequence number the packet descriptor is stored in a buffer and a corresponding valid bit is set.

21 Claims, 18 Drawing Sheets

MPLS ROUTER

MPLS ROUTER

MAC ISLAND
(INGRESS)

TRANSFERRED OVER MINIPACKET BUS

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 7

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE TO WHICH THE PACKET BELONGS. |
| 8-BITS | I/O DESTINATION TO WHICH THE PACKET IS TO BE SENT. |
| 5-BITS | PACKET SEQUENCER IDENTIFICATION |

EGRESS PACKET DESCRIPTOR

FIG. 8

ME ISLAND

MU ISLAND

PACKET REORDER BLOCK

PACKET SEQUENCER

PACKET SEQUENCE
REORDERING WINDOW

PACKET SEQUENCE
REORDERING WINDOW

METHOD OF OPERATION OF A SCRIPT-
BASED EGRESS PACKET SEQUENCER

METHOD OF OPERATION OF A SCRIPT-
BASED EGRESS PACKET SEQUENCER

PACKET SEQUENCER OPERATION

PACKET SEQUENCER OPERATION

MAC ISLAND
(EGRESS)

PACKET FLOW WHEN LOCAL MEMORY
RESOURCES ARE AVAILABLE

PACKET FLOW WHEN LOCAL MEMORY
RESOURCES ARE SCARCE

GUARANTEED IN-ORDER PACKET DELIVERY

TECHNICAL FIELD

The described embodiments relate generally to the order of packet delivery in a network. More specifically, the embodiments relate to guaranteed in-order packet delivery.

BACKGROUND INFORMATION

In a packet processing system packets are manipulated in various ways. For example, headers may be added to the packets, tags may be added to the packets, packets may be classified, or packets may be encrypted. Each of these manipulations may require different amounts of time to be processed. Consecutive packets within a given flow may be processed differently. This variable amount of processing time per packet may cause multiple packets to leave the processing unit in a different order from the order in which the packets entered the processing unit.

SUMMARY

In a first novel aspect, Network Flow Processor (NFP) includes circuitry to provide in-order packet delivery. The circuitry includes a packet reorder block, a memory unit, and a scheduler block. The packet reorder block receives a packet descriptor and a sequence number. The memory unit includes multiple buffers. The packet descriptor is stored in one of the buffers. The scheduler block receives the packet descriptor from the packet reorder block when the packet reorder block determines that the packet descriptor is ready to be output. The packet reorder block determines if the packet descriptor is ready to be output based on the sequence number.

In one specific example, the packet reorder block includes a valid bits register, a decoder, a packet sequencer, and a memory access unit. The valid bits register includes multiple valid bits. Each valid bit has a one-to-one correspondence to one buffer in the memory unit. A head pointer points to one valid bit in the valid bits register. The head pointer is also used to point to a corresponding buffer in the memory unit. The decoder receives a transmit packet command and in response generates configuration data. The packet sequencer receives the configuration data from the decoder and the packet descriptor and in response determines a first, a second, and a third range of non-overlapping sequence numbers. The packet sequencer also receives the packet descriptor, sets the valid bit associated with the buffer used to store the packet descriptor, and determines if the packet descriptor is ready to be output. The memory access unit receives memory requests from the packet sequencer and communicates with the memory unit and the sequencer block.

In a second specific example, if the sequence number is in the first range of non-overlapping sequence numbers, the packet sequencer: (i) communicates a memory access request to the memory access unit that causes the memory access unit to output all packet descriptors stored in buffers that are associated with the valid bits register to the scheduler block, (ii) clears all valid bits in the valid bits register, and (iii) resets the head pointer.

In a third specific example, if the sequence number is in the second range of non-overlapping sequence numbers, the packet sequencer: (i) communicates a memory access request to the memory access unit that causes the memory access unit to output only the packet descriptor to the scheduler block, and (ii) clears the valid bit.

In a fourth specific example, if the sequence number is in the third range of non-overlapping sequence numbers and the head pointer is equal to the sequence number, the packet sequencer: (i) communicates a memory request to the memory access unit that causes the memory access unit to output the packet descriptor to the scheduler block, (ii) clears the valid bit, and (iii) increments the head pointer.

In a fifth specific example, if the sequence number is in the third range of non-overlapping sequence numbers and the head pointer is not equal to the sequence number, the packet sequencer communicates a memory request to the memory access unit that causes the memory access unit to store the packet descriptor in a buffer in the memory unit.

In sixth specific example, the packet reorder block includes a second packet sequencer and the packet reorder block also receives a packet sequencer identification. If the packet sequencer identification is a first value, the first packet sequencer processes the packet descriptor. If the packet sequencer identification is a second value, the second packet sequencer processes the packet descriptor.

In a second novel aspect, the NFP performs multiple steps. In the first step, a packet descriptor is received. The packet descriptor includes a sequence number and is associated with a specific packet to be transmitted. In the second step, it is determined in which of three non-overlapping ranges of sequence numbers the received sequence number resides. In the third step, it is determined, based at least in part of the range in which the sequence number resides, if the packet associated with the packet descriptor is ready to be transmitted. If it is determined that the packet is ready to be transmitted: (i) the packet is transmitted, (ii) a flag is cleared indicating that the packet associated with the packet descriptor has been transmitted, (iii) the packet descriptor is deleted a buffer within the memory unit, and (iv) a head pointer pointing at a register storing the flag is incremented (optional). If it is determined that the packet is not ready to be transmitted: (i) a flag is set indicating that the packet associated with the packet descriptor has not been transmitted, and (ii) the packet descriptor is stored in a buffer within the memory unit.

In one specific example, configuration data is generated in response to receiving a transmit command. A first, second and third non-overlapping ranges of non-overlapping sequence numbers are determined based on the configuration data. The first non-overlapping range of sequence numbers is a "flush" range. If the sequence number resides within the flush range, all packet descriptors are output and valid bits are cleared. The second non-overlapping range of sequence numbers is a "send" range. If the sequence number resides within the send range, the packet descriptor is output and the valid bit associated with the packet descriptor is cleared. The third non-overlapping range of sequence numbers is the "store and reorder" range. If the sequence number resides within the store and reorder range, it is determined whether the sequence number is the next consecutive sequence number. If the sequence number is the next consecutive sequence number then the packet descriptor is output, the valid bit associated with the packet descriptor is cleared, and the head pointer is incremented. If the sequence number is not the next consecutive sequence number, and the packet descriptor is stored in a buffer in the memory unit, the valid bit associated with the packet descriptor is set.

In a third novel aspect, a packet descriptor and a sequence number is received. The packet descriptor is stored in a buffer in a memory unit. The memory unit includes multiple buffers. A register includes multiple valid bits and there is a one-to-one correspondence between the valid bits and the buffers. A head pointer points to one valid bit in the register. A valid bit corresponding to the buffer used to store the packet descriptor is set. If the sequence number is in a first range, then (i) outputting the received packet descriptor, and (ii) clearing the valid bit that is associated with the buffer that stored the packet descriptor. If the sequence number is in a second range then: (i) outputting the packet descriptor, and (ii) clearing the valid bit that is associated with the buffer that stored the packet descriptor. If the sequence number is in a third range then: (i) if the head pointer points to a set valid bit then outputting the packet descriptor, clear the valid bit associated with the buffer that stored the packet descriptor, increment the head pointer, and repeat, or (ii) if the head pointer does not point to a set valid bit then wait to receive the next packet descriptor.

In a fourth novel aspect, a packet descriptor and a sequence number is received. The sequence number is one of a plurality of sequence numbers. A plurality of buffers are maintained in a memory unit. There is a one-to-one correspondence between the buffers and the sequence numbers. A register is maintained that comprises a plurality of valid bits. There is a one-to-one correspondence between the valid bits and the buffers. A head pointer points to one valid bit in the register. If the sequence number is in a first range: (i) all packet descriptors stored in the memory unit that are associated with the plurality of sequence numbers are outputted, and (ii) all valid bits that are associated with the buffers that stored the output packet descriptors are cleared. If the sequence number is in a second range then the packet descriptor is output. If the sequence number is in a third range then: (i) if the head pointer is equal to the sequence number then outputting the packet descriptor, and incrementing the head pointer, and repeating, or (ii) if the head pointer is not equal to the sequence number then the packet descriptor is stored in the buffer that corresponds to the sequence number, the valid bit that corresponds to the sequence number is set, and returning to the beginning of the process.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth the parts of an ingress packet descriptor.

FIG. 8 is a table that sets forth the parts of an egress packet descriptor.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
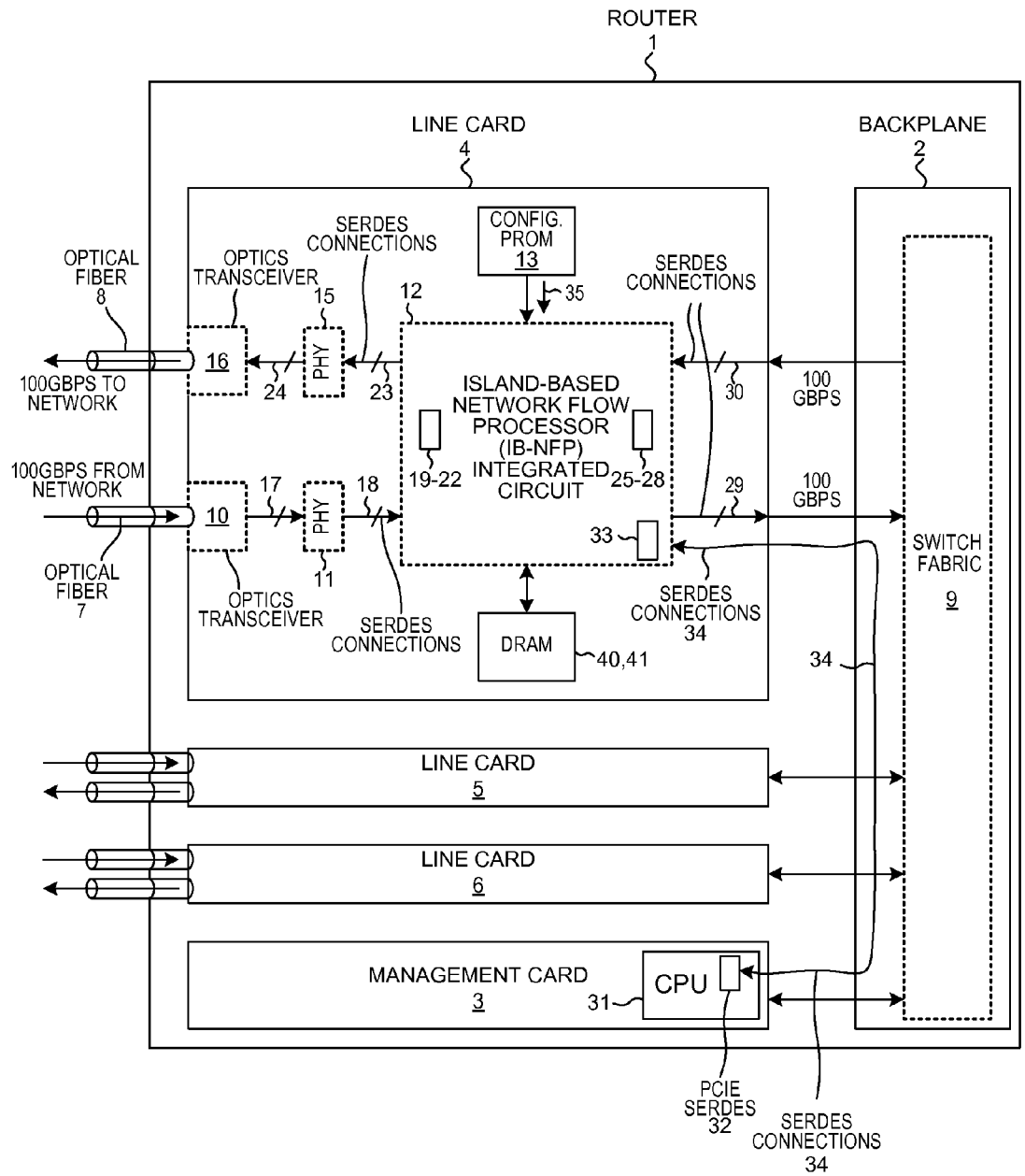
FIG. 1 is a simplified diagram of an MPLS (MultiProtocol Label Switching) router 1.

FIG. 1 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12.

External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 2:
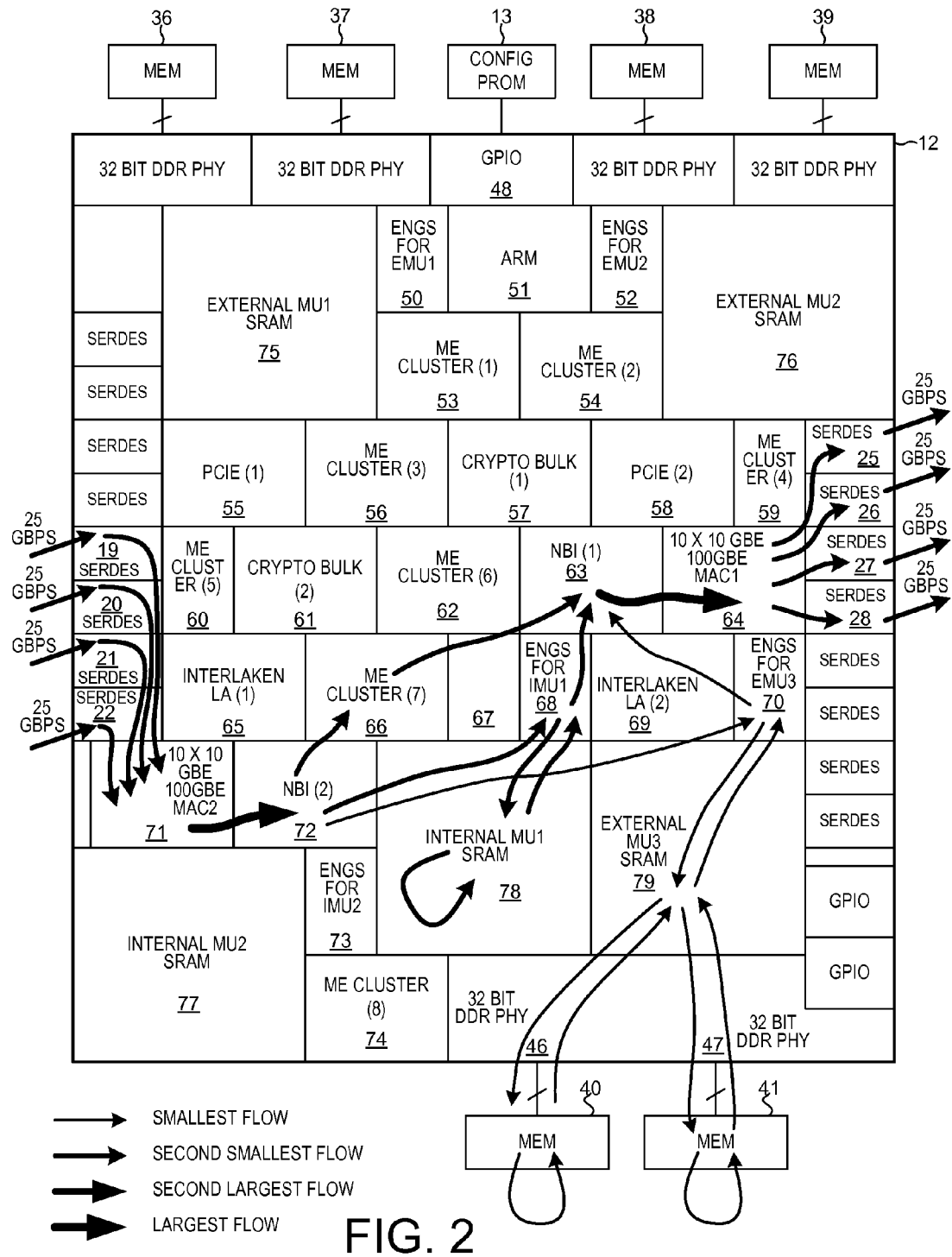
FIG. 2 is a schematic diagram that illustrates an operational example of IB-NFP integrated circuit 12 within the MPLS router 1 of FIG. 1.

FIG. 2 is a schematic diagram that illustrates an operational example of IB-NFP integrated circuit 12 within the MPLS router 1 of FIG. 1. 100 Gbps packet traffic is received via optical cable 7 (see FIG. 1), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 1. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface) island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

In the operational example of FIG. 2, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines header modification and queuing strategy for the packet based on the packet flow (derived from packet header and contents) and the ME island 66 informs a second NBI island 63 of these. In this simplified example being described, the payload portions of fast-path packets are placed into internal SRAM (Static Random Access Memory) MU block 78 and the payload portions of exception packets are placed into external DRAM 40 and 41.

Half island 68 is an interface island through which all information passing into, and out of, SRAM MU block 78 passes. The functional circuitry within half island 68 serves as the interface and control circuitry for the SRAM within block 78. For simplicity purposes in the discussion below, both half island 68 and MU block 78 may be referred to together as the MU island, although it is to be understood that MU block 78 is actually not an island as the term is used here but rather is a block. In one example, MU block 78 is an amount of so-called "IP" that is designed and supplied commercially by a commercial entity other than the commercial entity that designs and lays out the IB-NFP integrated circuit. The area occupied by block 78 is a keep out area for the designer of the IB-NFP in that the substantially all the wiring and all the transistors in block 78 are laid out by the memory compiler and are part of the SRAM. Accordingly, the mesh buses and associated crossbar switches of the configurable mesh data bus, the mesh control bus, and the mesh event bus do not pass into the area of block 78. No transistors of the mesh buses are present in block 78. There is an interface portion of the SRAM circuitry of block 78 that is connected by short direct metal connections to circuitry in half island 68. The data bus, control bus, and event bus structures pass into and over the half island 68, and through the half island couple to the interface circuitry in block 78. Accordingly, the payload portion of the incoming fast-path packet is communicated from NBI island 72, across the configurable mesh data bus to SRAM control island 68, and from control island 68, to the interface circuitry in block 78, and to the internal SRAM circuitry of block 78. The internal SRAM of block 78 stores the payloads so that they can be accessed for flow determination by the ME island.

In addition, a preclassifier in the ingress NBI island determines that the payload portions for others of the packets should be stored in external DRAM 40 and 41. For example, the payload portions for exception packets are stored in external DRAM 40 and 41. Interface island 70, IP block 79, and DDR PHY I/O blocks 46 and 47 serve as the interface and control for external DRAM integrated circuits 40 and 41. The payload portions of the exception packets are therefore communicated across the configurable mesh data bus from NBI island 72, to interface and control island 70, to external MU SRAM block 79, to 32-bit DDR PHY I/O blocks 46 and 47, and to external DRAM integrated circuits 40 and 41. At this point in the operational example, the packet header portions and their associated payload portions are stored in different places. The payload portions of fast-path packets are stored in internal SRAM in MU block 78, whereas the payload portions of exception packets are stored in external SRAM in external DRAMs 40 and 41.

ME island 66 informs second NBI island 63 where the packet headers and the packet payloads can be found and provides the second NBI island 63 with an egress packet descriptor for each packet. The egress packet descriptor indicates a queuing strategy to be used on the packet. Second NBI island 63 uses the egress packet descriptor to read the packet headers and any header modification from ME island 66 and to read the packet payloads from either internal SRAM 78 or external DRAMs 40 and 41. Second NBI island 63 places packet descriptors for packets to be output into the correct order. For each packet that is then scheduled to be transmitted, the second NBI island uses the packet descriptor to read the header portion and any header modification and the payload portion and to assemble the packet to be transmitted. Note that the header modification is not actually part of the egress packet descriptor, but rather it is stored with the packet header by the ME when the packet is presented to the NBI. The second NBI island then performs any indicated packet modification on the packet. The resulting modified packet then passes from second NBI island 63 and to egress MAC island 64.

Egress MAC island 64 buffers the packets, and converts them into symbols. The symbols are then delivered by conductors from the MAC island 64 to the four SerDes I/O blocks 25-28. From SerDes I/O blocks 25-28, the 100 Gbps outgoing packet flow passes out of the IB-NFP integrated circuit 12 and across SerDes connections 34 (see FIG. 1) and to switch fabric 9. Twelve virtual output ports are provided in the example of FIG. 1.

Figure 3:
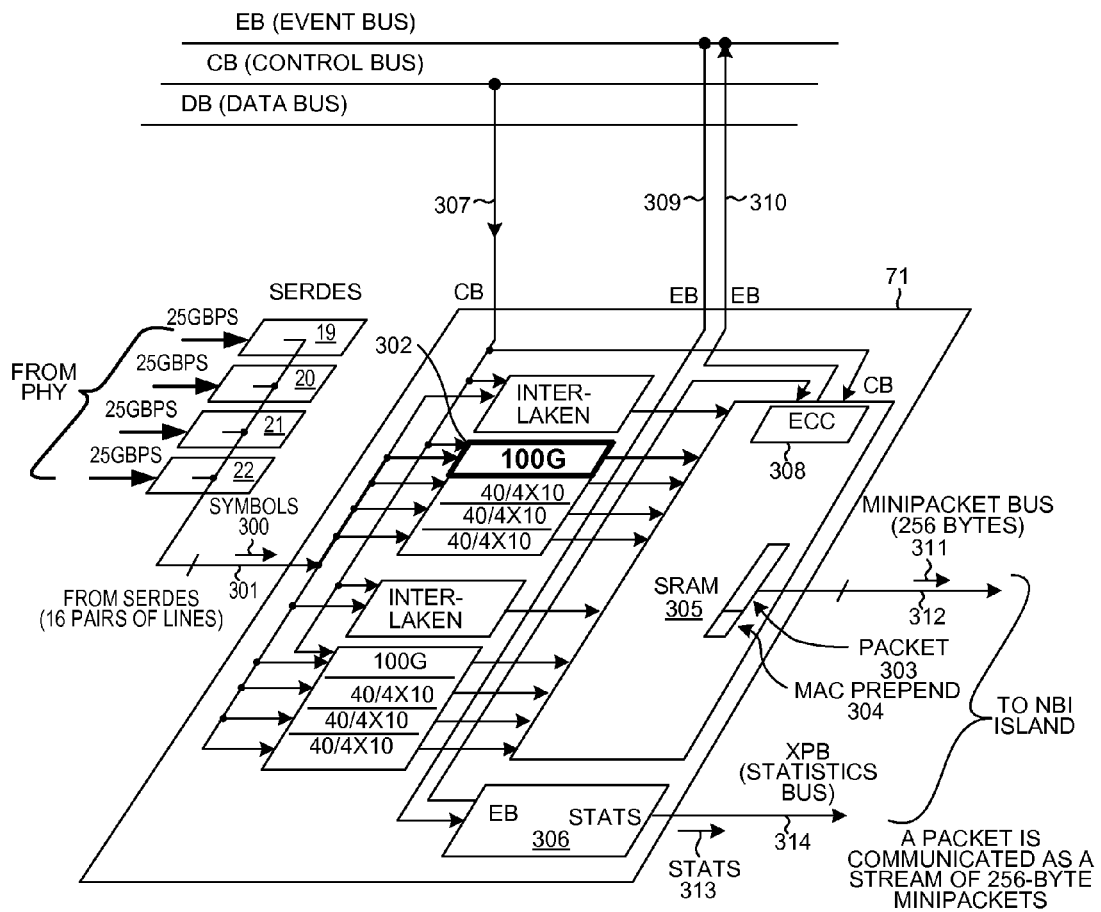
FIG. 3 is a diagram of the four SerDes I/O blocks 19-22 and the ingress MAC island 71 of IB-NFP integrated circuit 12.

FIG. 3 is a diagram of the four SerDes I/O blocks 19-22 and the ingress MAC island 71. The symbols 300 pass from the four SerDes I/O blocks and to the ingress MAC island across dedicated conductors 301. The symbols are converted into packets by a 100 Gbps ethernet block 302. The 100 Gbps ethernet block 302 analyzes the packets and places the results in this analysis at the beginning of the packet in the form of a "MAC prepend" value. The resulting packets and associated MAC prepend values are then buffered in SRAM 305. Reference numeral 303 identifies a part of the block that represents one packet and reference numeral 304 identifies a part of the block that represents the MAC prepend value. The MAC prepend value 304 includes: 1) an indication of the length of the packet, 2) an indication whether the packet is an IP packet, 3) and indication of whether the checksums are correct, and 4) a time stamp indicating when the packet was received.

As packets are loaded into SRAM, a statistics block 306 counts the number of packets that meet certain criteria. Various sub-circuits of the ingress MAC island are configurable. The input conductors 307 labeled CB couples the certain portions of the MAC island to the control bus tree so that these portions receive configuration information from the root of control bus tree. SRAM block 305 includes error detection and correction circuitry (ECC) 308. Error information detected and collected by ECC block 308 and statistics block 306 is reported through the local event bus and global event chain back to the ARM island 51. Ingress MAC island 71 is part of one of the local event rings. Event packets are circulated into the MAC island via conductors 309 and are circulated out of the MAC island via conductors 310. Packets that are buffered in SRAM 305 are then output from the MAC island to the ingress NBI island 72 in the form of one or more 256 byte minipackets 311 communicated across dedicated connections 312. Statistics information 313 is also communicated to the ingress NBI island 72 via dedicated connections 314.

Figure 4:
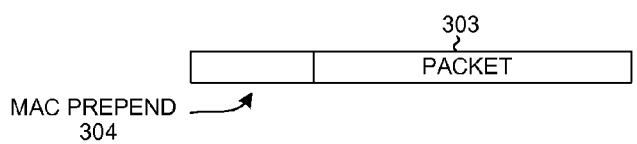
FIG. 4 is a diagram that illustrates how a packet is communicated as a sequence of minipackets across connections 312.

FIG. 4 is a diagram of packet 303 communicated across connections 312.

Figures 5, 6:
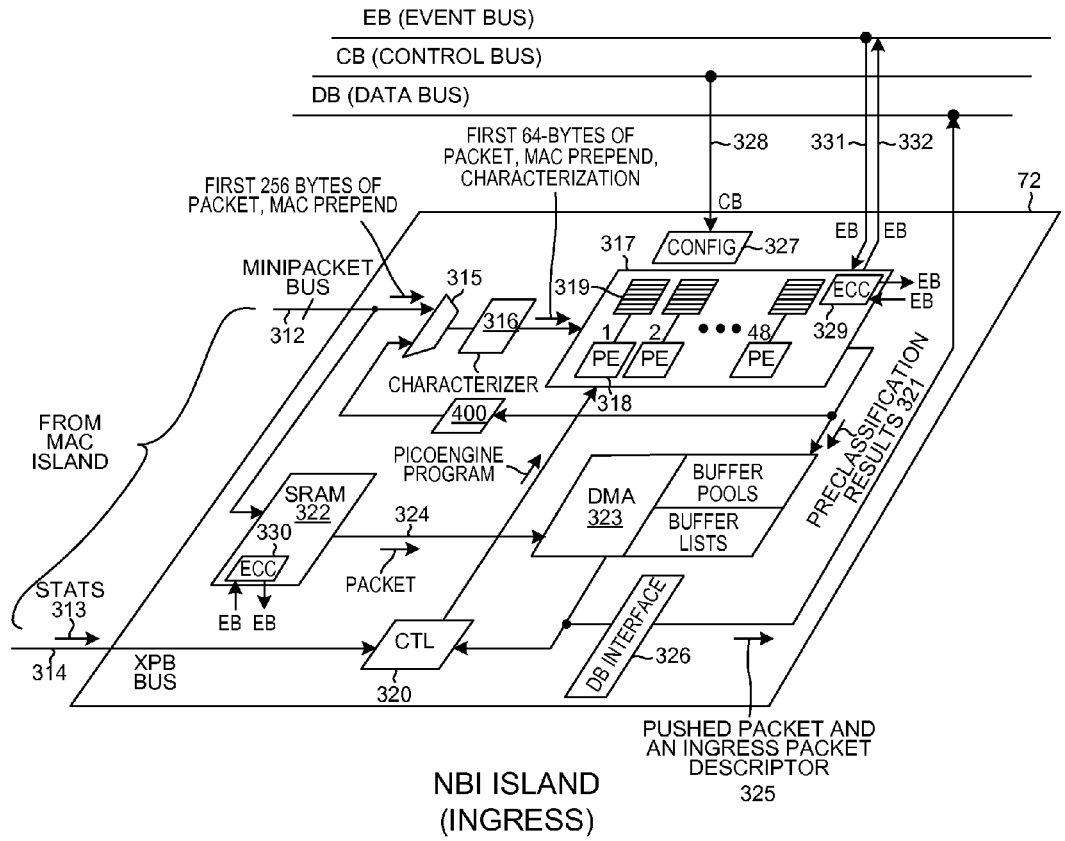
FIG. 5 is a diagram of ingress NBI island 72.
FIG. 6 is a table that sets forth the parts of preclassification results 321.

FIG. 5 is a diagram of ingress NBI island 72. Ingress NBI island 72 receives the MAC prepend and the minipackets via dedicated connections 312 from the ingress MAC island 72. The first 256 bytes of the packet and the MAC prepend pass through multiplexing circuitry 315 and to a characterizer 316. Characterizer 316 outputs characterization information, the first sixty-four bytes of the packet, and the MAC prepend. This is passed to a pool 317 of forty-eight picoengines. Each picoengine executes a program stored in an associated instruction control store. Reference numeral 318 identifies the first picoengine and reference numeral 319 identifies its instruction control store. The program in the instruction control store for each picoengine can be updated and changed under software control via control block 320. Control block 320 is also usable to receive the statistics information 313 from the MAC island via XPB bus connections 314. To perform deeper and deeper analysis into the header structure of an incoming packet, the output of the pool 317 can be passed back through a tunnel recirculation path and tunnel recirculation FIFO 400 to the characterizer 316 in an iterative fashion. Pool 317 outputs preclassification results 321.

FIG. 6 is a table that sets forth the part of preclassification results 321. The preclassification results 321 include: 1) a determination of which one of multiple buffer pools to use to store the packet, 2) a sequence number for the packet in a particular flow of packets through the IB-NFP, and 3) user metadata. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

The packet is buffered in SRAM 322. A buffer pool is a set of targets in ME islands where header portions can be placed. A buffer list is a list of memory addresses where payload portions can be placed. DMA engine 323 can read the packet out of SRAM via conductors 324, then use the buffer pools to determine a destination to which the packet header is to be DMA transferred, and use the buffer lists to determine a destination to which the packet payload is to be DMA transferred. The DMA transfers occur across the configurable mesh data bus. In the case of the exception packet of this example the preclassification user metadata and buffer pool number indicate to the DMA engine that the packet is an exception packet and this causes a first buffer pool and a first different buffer list to be used, whereas in the case of the fast-path packet the preclassification user metadata and buffer pool number indicate to the DMA engine that the packet is a fast-path packet and this causes a second buffer pool and a second buffer list to be used. Block 326 is data bus interface circuitry through which the configurable mesh data bus in accessed. Arrow 325 represents packets that are DMA transferred out of the NBI island 72 by DMA engine 323. Each packet is output with a corresponding ingress packet descriptor.

FIG. 7 is a table that sets forth the parts of an ingress packet descriptor. An ingress packet descriptor includes: 1) an address indicating where and in which ME island the header portion is stored, 2) an address indicating where and in which MU island the payload portion is, 3) how long the packet is, 4) a sequence number for the flow to which the packet belongs, 5) user metadata.

The programs stored in the instruction stores that are executable by the picoengines can be changed multiple times a second as the router operates. Configuration block 327 receives configuration information from the control bus CB tree via connections 328 and supplies the configuration information to various ones of the sub-circuits of NBI island 72 that are configurable. Error detection and correction (ECC) circuitry 329 collects error information such as errors detected in the contents of the instruction stores. ECC circuitry 329 and ECC circuitry 330 are coupled via connections 331 and 332 and other internal island connections not shown to be part of the local event ring of which the ingress MAC island 72 is a part.

Figure 9:
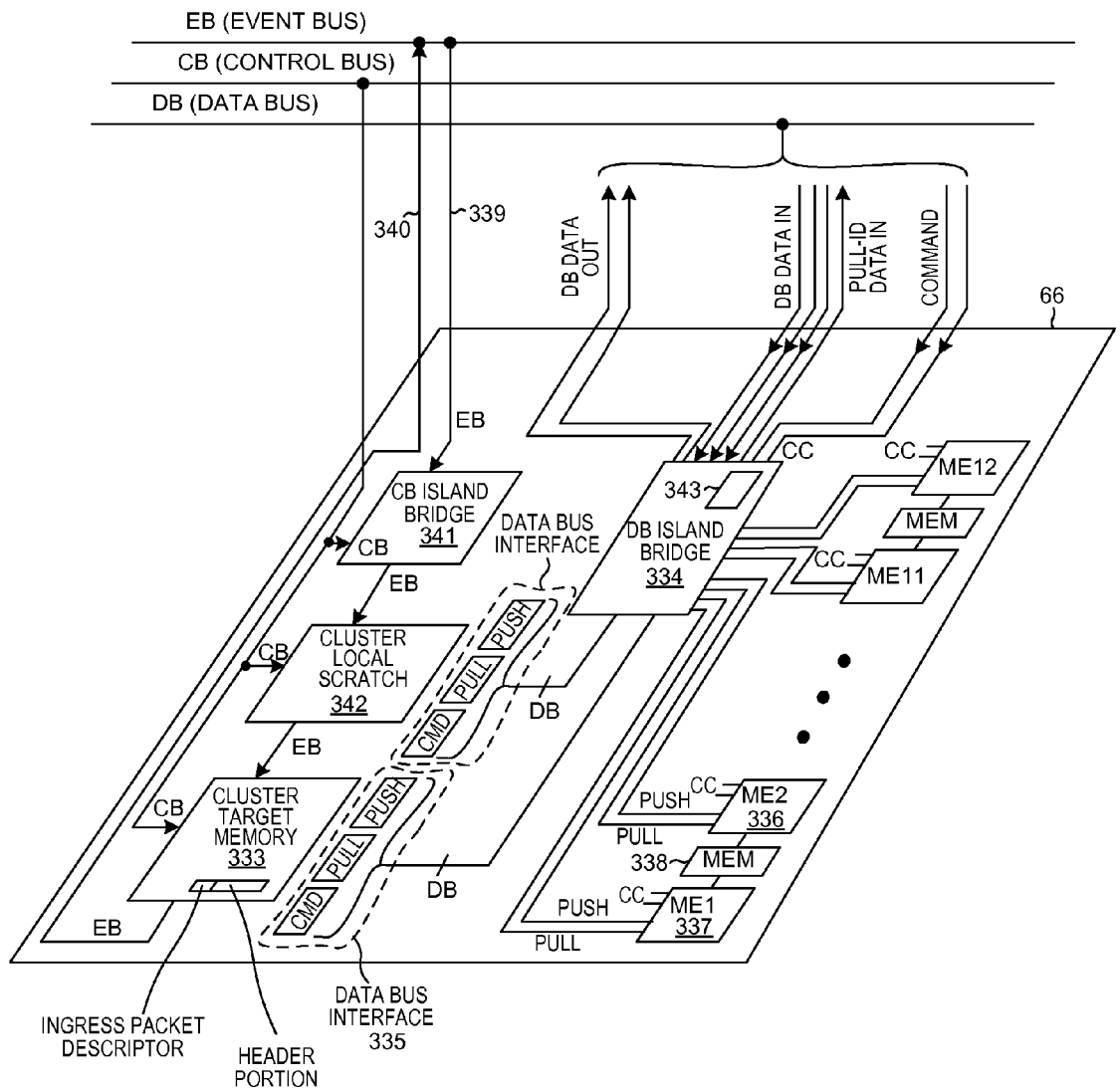
FIG. 9 is a diagram of the microengine (ME) island 66.

FIG. 9 is a diagram of the microengine (ME) island 66. In the present operational example, packet headers and the associated preclassification results are DMA transferred from the ingress NBI island 72 across the configurable mesh data bus and into the Cluster Target Memory (CTM) 333 of the ME island 66. The DMA engine 323 in the ingress NBI island is the master and the CTM 333 is the target for this transfer. The packet header portions and the associated ingress packet descriptors pass into the ME island via data bus island bridge 334 and data bus interface circuitry 335. Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of picoengines and reference numeral 338 identifies the shared memory. As a result of analysis and processing, the microengines modify each ingress packet descriptor to be an egress packet descriptor as shown in FIG. 8. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is, and 8) packet sequencer identification to be used by the reorder block in determining in-order packet transmissions.

Memory errors and other events detected in the ME island are reported via a local event ring and the global event chain back to the ARM island 51. A local event ring is made to snake through the ME island for this purpose. Event packets from the local event chain are received via connections 339 and event packets are supplied out to the local event chain via connections 340. The CB island bridge 341, the cluster local scratch 342, and CTM 333 can be configured and are therefore coupled to the control bus CB via connections 343 so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as described above as if the memory were outside the island in another island, except that bus transaction values do not have a final destination value. The bus transaction values do not leave the ME island and therefore do not need the final destination information. If, on the other hand, the target is not local within the ME island then intelligence 343 within the DB island bridge adds the final destination value before the bus transaction value is sent out onto the configurable mesh data bus. From the perspective of the microengine master, the interaction with the target has the same protocol and command and data format regardless of whether the target is local or remote.

Figure 10:
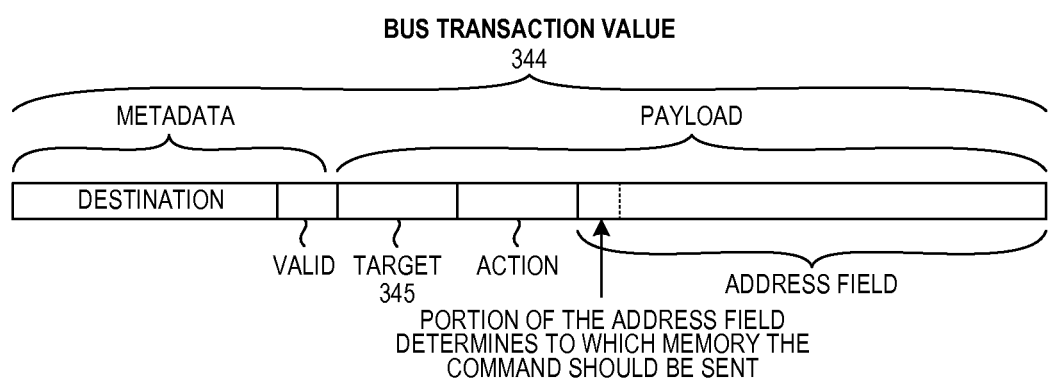
FIG. 10 is a bit sequence map of a bus transaction value used to communicate packet data from the ingress NBI island 72 to the ME island 66 across the CPP data bus.

FIG. 10 is a diagram of a bus transaction value 344 used to communicate packet data from the ingress NBI island 72 to the ME island 66. In a multi-target island such as the ME island 66, the target field 345 of the bus transaction value contains a number that indicates which target it is that is to receive the payload of the bus transaction value. In the present example, the header portions of the incoming 100 Gbps flow are written into CTM 333.

Figure 11:
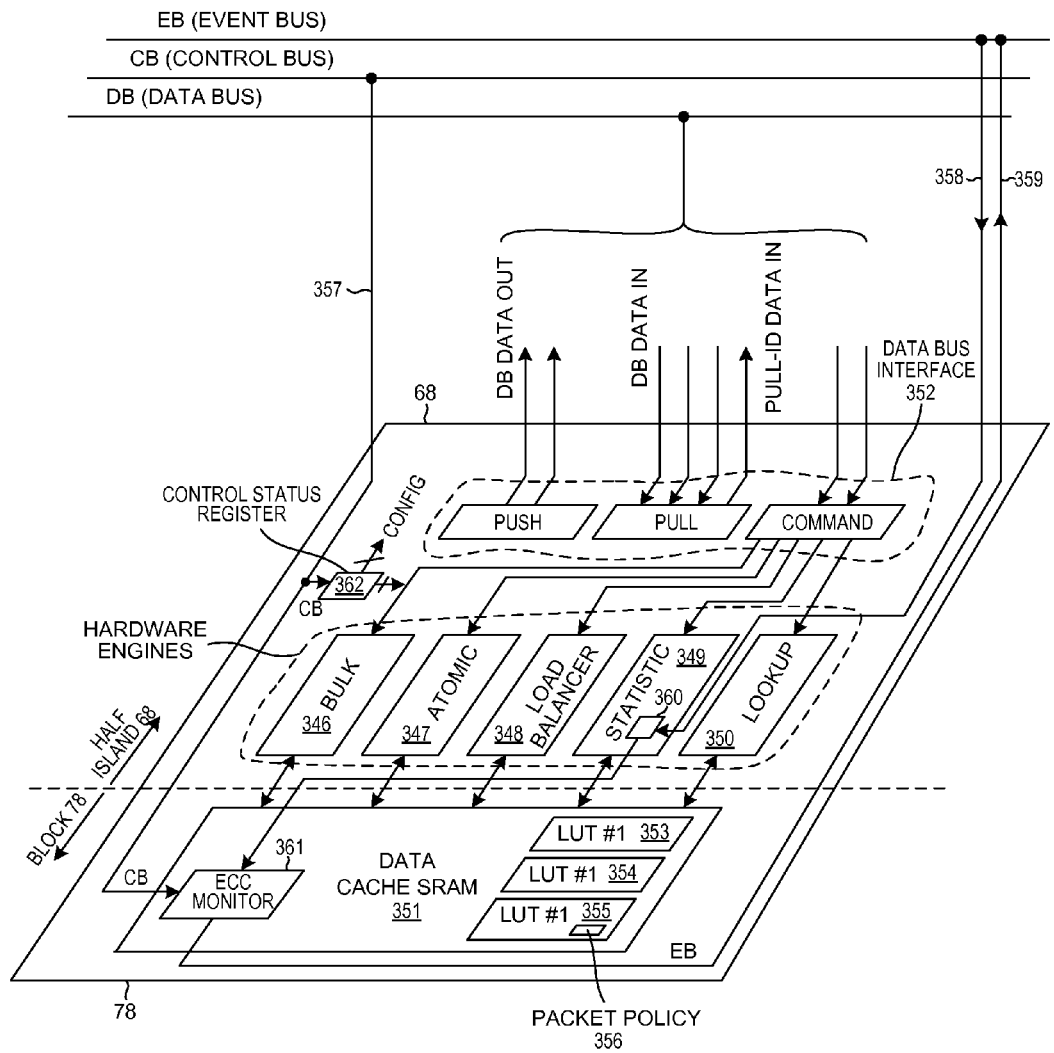
FIG. 11 is a diagram of MU half island 68 and associated SRAM block 78.

FIG. 11 is a diagram of MU half island 68 and SRAM block 78. MU half island 68 includes several hardware engines 350. In the operational example, packet payloads are DMA transferred directly from ingress NBI island 72 and across the configurable mesh data bus, through data bus interface 352 of half island 68, and into the data cache SRAM 351 block 78. The ingress NBI DMA engine 323 issues a bulk write command across the configurable mesh data bus to the bulk transfer engine 346. The destination is the MU island. The action is bulk write. The address where the data is to be written into the MU island is the address taken out of the appropriate buffer list. The bulk write command received at the MU is a bulk write, so the data bus interface 352 presents the command to the bulk engine. The bulk engine examines the command which is a write. In order to perform a write the bulk engine needs data, so the bulk engine issues a pull-id through the pull portion of interface 352, which in turn issues a pull-id back onto the configurable mesh data bus. The NBI DMA engine 323 receives the pull-id. Part of the pull-id is a data reference which indicates to the DMA engine which part of the packet is being requested as data. The DMA engine uses the data reference to read the requested part of the packet, and presents that across the data part of the data bus back to the bulk engine 346. The bulk engine 346 then has the write command and the packet data. The bulk engine 346 ties the two together, and it then writes the packet data into the SRAM 351 at the address given in the write command. In this way, packet payload portions pass from DMA engine in the ingress NBI island, across the configurable mesh data bus, through the data bus interface 352, through a bulk transfer engine 346, and into data cache SRAM 351.

In the present operational example, a microengine in the ME island 66 issues a lookup command across the configurable mesh data bus to have lookup hardware engine 350 examine tables in SRAM 351 for the presence of given data. The data to be looked for in this case is a particular MPLS label. The lookup command as received onto the MU island is a lookup command so the data base interface 352 presents the lookup command to the lookup engine. The lookup command includes a table descriptor of what part to memory to look in. The lookup command also contains a pull-id reference indicating what to look for (the MPLS label in this case). The data to look for is actually stored in transfer registers of the originating microengine. The lookup engine 350 therefore issues a pull-id out onto the configurable mesh data bus request back to the originating microengine. The microengine returns the requested data (the MPLS label to look for) corresponding to the reference id. The lookup engine now has the lookup command, the table descriptor, and the MPLS label that it is to look for. In the illustration there are three tables 353-355. A table description identifies one such table by indicating the starting address of the table in SRAM 351, and how large the table is. If the lookup operation is successful in that the lookup hardware engine 350 finds the MPLS label in the table identified by the table descriptor, then the lookup hardware engine 350 returns a predetermined value "Packet Policy" 356 back to the requesting microengine. A packet policy is a code that indicates: 1) a header modification to be done, and 2) a queuing strategy to use. Lookup engine 350 returns the packet policy 356 to the originating microengine by pushing the data (the packet policy) via the push interface of the configurable mesh data bus.

Various parts of the MU island are configurable by changing the contents of registers and memory via the control bus CB and connections 357 and control status registers 362. Errors detected on the MU island by circuits 360 and 361 are reported into a local event ring. Event packets from the local event ring are received via input connections 358 and the MU island outputs event packets to the local even ring via output connections 359. Various sub-circuits of the MU island are configurable.

Figure 12:
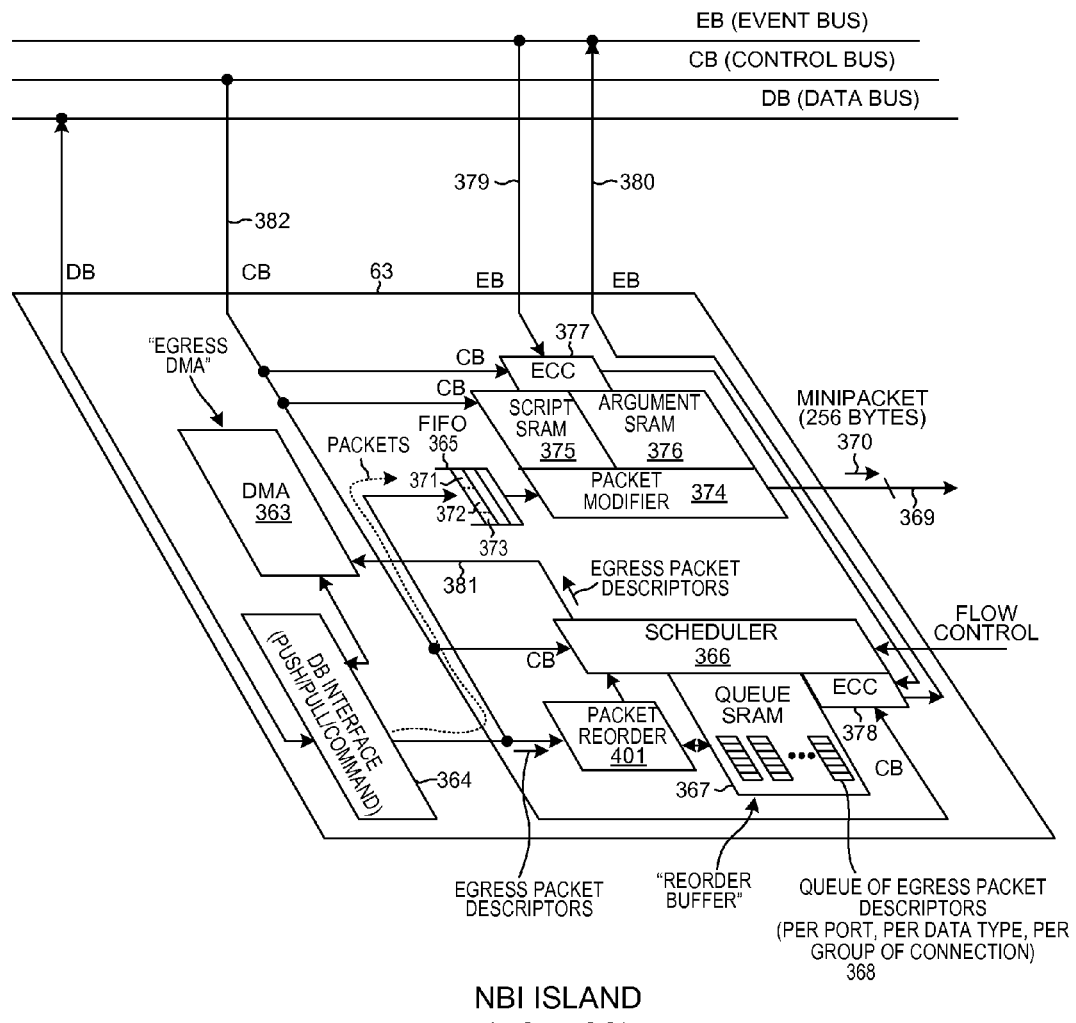
FIG. 12 is a diagram of egress NBI island 63.

FIG. 12 is a diagram of egress NBI island 63. In the operational example, ME island 66 instructs the egress NBI island 63 to transmit a packet by supplying the egress NBI island with an egress packet descriptor of the packet to be transmitted. The ME island supplies the egress packet descriptor to the egress NBI island by issuing a transmit packet command across the configurable mesh data bus and to the packet reorder block 401. The packet reorder block 401 responds by pulling the packet descriptor from the ME island across the configurable mesh data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

DMA engine 363 receives such an egress packet descriptor, and based on the information in the descriptor, transfers the payload portion and the header portion of the packet across configurable mesh data bus and DB interface 364 and into FIFO 365. In the illustration of FIG. 6, each entry in FIFO 365 includes a complete packet having the header portion 371, the payload portion 372, and a script identifier portion 373. The script identifier portion 373 was added by the ME island. As a result of the lookup performed at the direction of the ME island, a packet policy was determined, and part of this packet policy is an indication of what of the packet header to change and how to change it before the packet is transmitted. An example of such a modification is to change the MAC source and destination addresses at the time the packet is output from the IB-NFP.

In a typical MPLS router, the MPLS labels of packets can remain the same as the packets flow into and through and out of the router. The MAC addresses of such a packet, however, should be changed on a hop by hop basis. The MAC hop on the ingress may be different from the MAC address on the egress. Accordingly, the packet exiting the MPLS router should have its source and destination MAC addresses changed to be appropriate for the next MAC hop into which the packet will be transmitted. The ME island supplies a script identifier portion for each packet for this purpose. The script identifier portion includes a code that identifies one of the scripts present in script SRAM 375. The identified script, when executed by packet modifier 374, causes the MAC addresses for the associated packet to be changed to values stored in an associated argument SRAM 376. Each resulting modified packet is then output from the egress NBI island 63 as a sequence of 256 byte minipackets across dedicated connections 369 to egress MAC island 64. Reference numeral 370 identifies one such minipacket.

Error conditions detected by ECC circuits 377 and 378 are injected into a local event ring in the form of event packets. Event packets from the local event ring are received onto the egress NBI island via connections 379, and event packets from the egress NBI island are supplied through the remainder of the local event ring via connections 380. Various parts of the egress NBI island are configurable. Configuration information for this purpose is received onto the egress NBI island from the control bus CB via connections 382.

Figure 13:
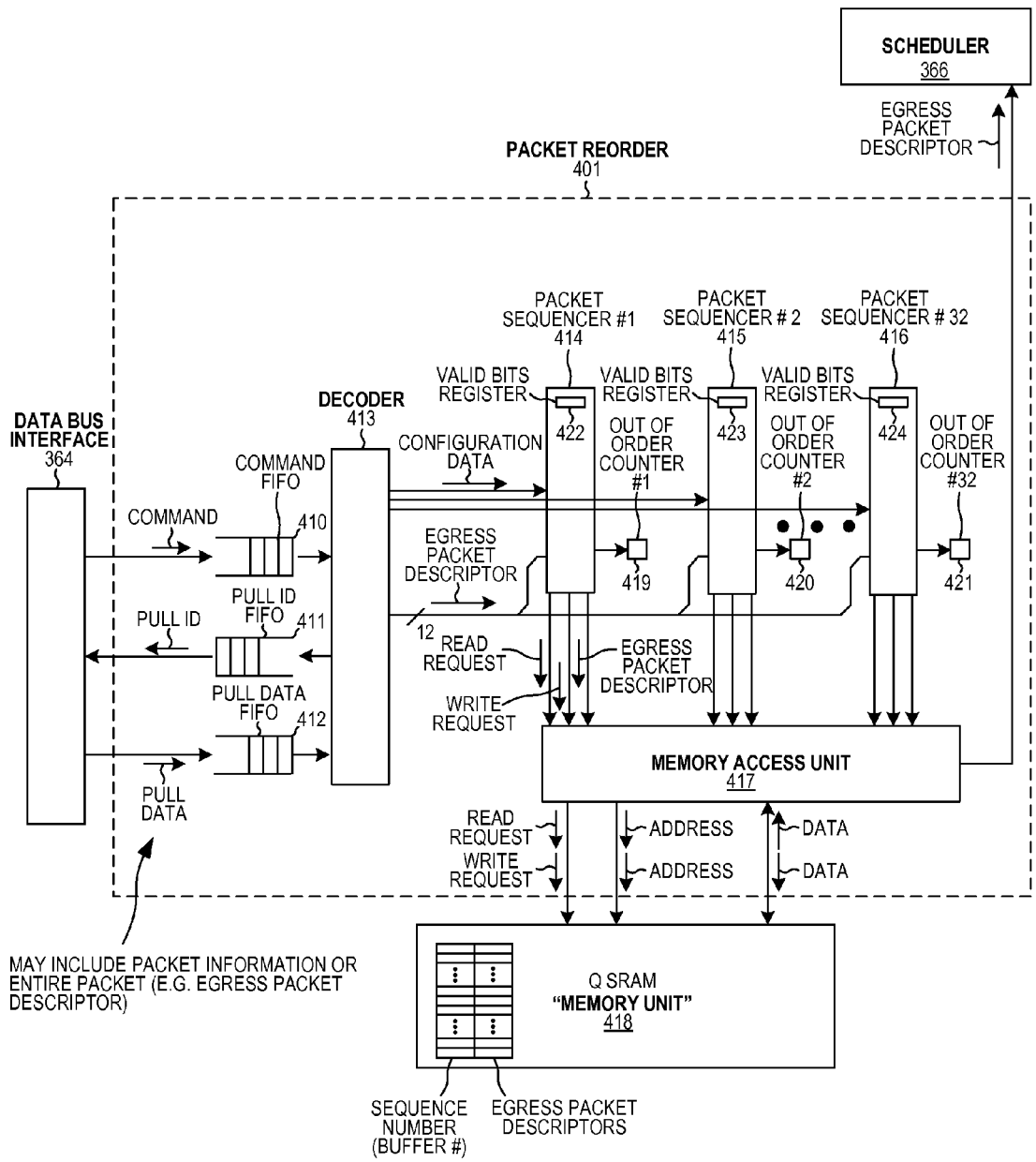
FIG. 13 is a diagram of packet reorder block 401.
Figure 14:
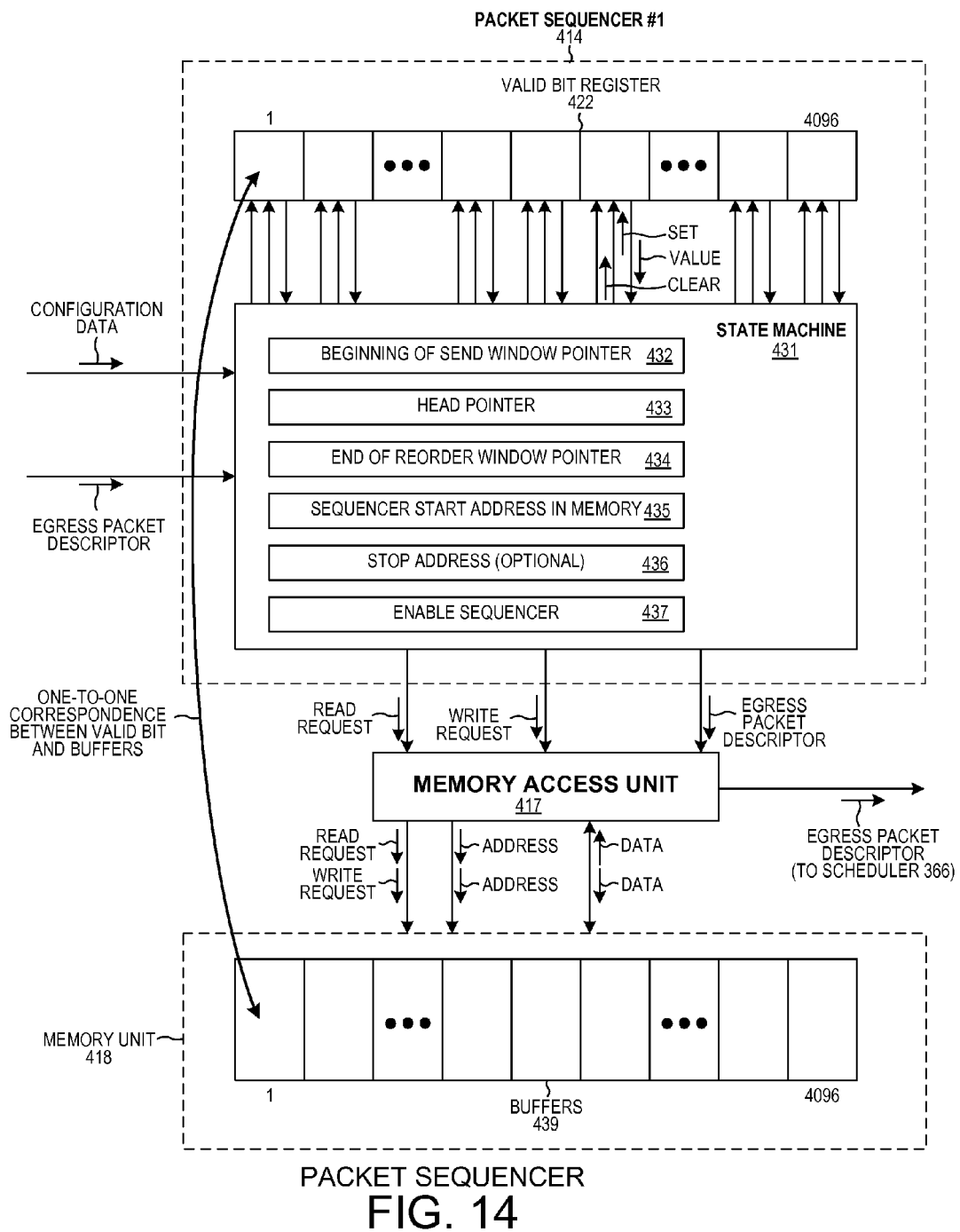
FIG. 14 is a diagram of packet sequencer 414.

FIG. 13 is a diagram of packet reorder block 401. Packet reorder block 401 includes FIFOs 410-412, decoder 413, thirty-two packet sequencers #1-#32 414-416, out of order counters 419-421, and memory access unit 417. Memory unit 418 includes a plurality of buffers. Each buffer stores one packet descriptor. FIG. 14 is a more detailed diagram of packet sequencer 414. Packet sequencer 414 includes a valid bit register 422 and a state machine 431. Each valid bit within the valid bits register 422 has a one-to-one correspondence to a single buffer within memory unit 418. In operation, the valid bits are used as flags that indicate if packet descriptors have been received and stored in memory unit 418. This allows state machine 431 to quickly determine if a specific packet descriptor (having a unique sequence number) has been received without accessing memory unit 418. The time required to check that state of a single bit in a register is much less than the time required to perform a read from a larger memory device, such as an SRAM. State machine 431 runs based on a set of information including beginning of send window pointer 432, head pointer 433, end of reorder window pointer 434, start address 436, and enable sequencer 437. As mentioned above, the egress packet descriptors are reordered so that the descriptors for the packets of a flow are in proper sequence. In one example, in response to receiving the transmit packet command via data bus interface 364 and FIFO 410 decoder 413 generates configuration data that is provided to one packet sequencer. The configuration data includes information that defines a reordering window to be used by the sequencer to reorder incoming packets. As shown in FIG. 14, the configuration data includes beginning of send window pointer, head pointer, end of reorder window pointer, start address, and enable sequencer. At a high level, the packet sequencer uses the reordering window and the sequence number included in the packet descriptor to determine the order in which packets are transmitted. In one example, one packet sequencer is assigned to manage the order in which packets are transmitted for a specific flow of packets (e.g. packet sequencer #1 is used to manage the order in which packets from a first flow are transmitted, and packet sequencer #2 is used to manage the order in which packets from a second flow are transmitted, etc. . . . ). When a packet sequencer determines that a packet is ready to be transmitted, the packet sequencer sends a request to the memory access unit 417 to communicate the packet descriptor associated with the packet to the scheduler 366. In response to receiving the packet descriptor, scheduler 366 proceeds to cause the packet to be transmitted as described above. Alternatively, when the packet sequencer determines that the packet associated with the packet descriptor is not ready to be transmitted, the packet sequencer sends a request to memory access unit 417 to store packet descriptor in memory unit 418. Memory unit 418 stores packet descriptors and their associated sequencer number. Packet descriptors are stored in memory unit 418 at an address offset equal to the head pointer plus the difference between the sequence count value and the expected sequence count value.

Figure 15:
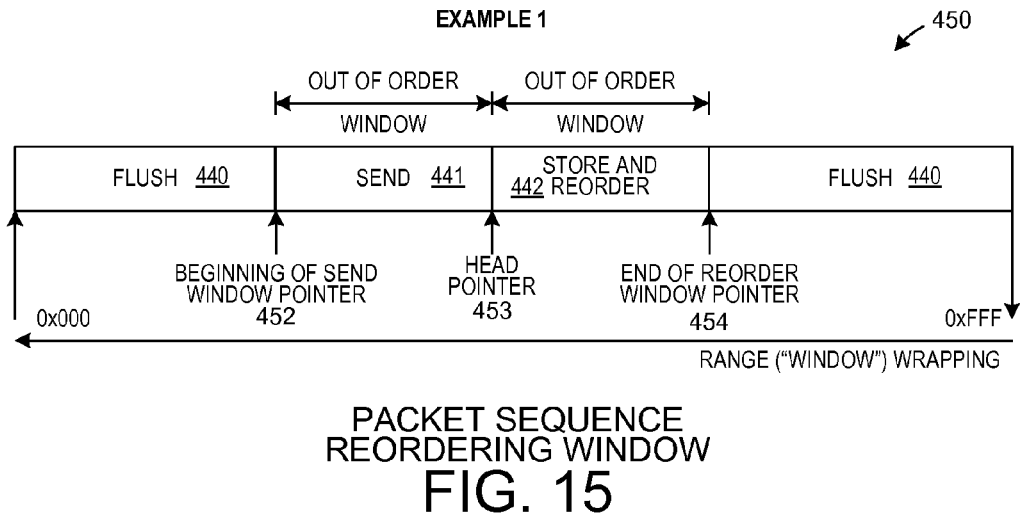
FIG. 15 is a diagram of an example of a packet sequence reordering window 450.

A first example of reorder window 450 is illustrated in FIG. 15. The reorder window 450 includes three ranges of non-overlapping sequence numbers: a "store and reorder window" 442, a "send window" 441, and a "flush window" 440. The store and reorder window 442 is a range of consecutive sequence numbers ranging from the head pointer to the head pointer plus the out of order limit. The send window 441 starts at the beginning of send window pointer 452 and ends at one bit before the head pointer 453. The flush window starts one bit after the end of reorder window pointer and ends at on bit before the beginning of send window pointer. At startup the head pointer is set to 1 and the packet reoder block expects to receive a packet descriptor including a sequence number of 1. In operation, the packet reorder block receives a packet descriptor including a specific sequence number. The sequence number will be within one of the three non-overlapping ranges of sequence numbers.

If the sequence number is within the "store and reorder window" range, the packet sequencer will compare the sequence number to the head pointer. If the sequence number is equal to the head pointer, the packet sequencer will (i) send a request to memory access unit 417 causing the packet descriptor to be communicated to scheduler 366, (ii) increment the head pointer, and (iii) clear the valid bit of the sequence number, and (iv) check if the valid bit at the incremented head pointer is set. In the event that the valid bit at the incremented head pointer is set (step iv), the packet sequencer repeats steps (i) through (iv).

If the sequence number is not equal to the head pointer, the packet sequencer will (i) send a request to memory access unit 417 causing the packet descriptor to be stored in a buffer (corresponding to the sequence number) within memory unit 418, and (ii) set the valid bit of the sequence number.

If the sequence number is within the "send window" range, the packet sequencer will (i) immediately send a request to memory access unit 417 causing the packet descriptor to be communicated to scheduler 366, (ii) increment the out of order counter, and (iii) clear the valid bit at the sequence number. A purpose of the send window is to ensure that ordering can be established following a flush event. The purpose of the out of order counter is to provide diagnostic information. In one example, the out of order value stored in the out of order counter is utilized by network diagnostic software so to keep track of how many packets are sent out of order. This information can be used to monitor the re-ordering capabilities of the network flow processor and to adjustment to the physical network or the network software to decrease the packet latency variation. In operation, the out of order value is communicated from the sequencer across the CPP bus to ARM 51. The out of order counter is reset when the head pointer is reset.

If the sequence number is within the "flush window" range, the packet sequencer will (i) send a request to memory access unit 417 causing all packet descriptors associated with the valid bits register of the packet sequencer that are stored the memory unit 418 to be communicated to scheduler 366, (ii) clear all valid bits in the valid bit register, and (iii) the head pointer is set to one greater than the sequence number associated with the last packet descriptor communicated to scheduler 366. In another example, after a flush event, the packet sequencer causes all received packet descriptors to be communicated to scheduler 366 until the packet sequencer receives three consecutive in-order sequence numbers at which point the packet reordering operation resumes. In another example, the flush window event is triggered if a duplicate sequence number is received by the packet sequencer. Reception of a duplicate sequence number may be caused by an error in the sequence number creation. Alternatively, reception of a duplicate sequence number may be caused by sequentially receiving packet descriptors 0xFFF sequence numbers apart. In both of these scenarios, all stored packet descriptors should be flushed.

It is noted herein that the head pointer may be used as pointer to both a valid bit and a buffer that corresponds to the valid bit. Alternatively, the head pointer may be added or subtracted with another value to generate a pointer to the valid bit or the corresponding buffer. For example, a pointer to the valid bit may be generated by adding the sequence number to the head pointer. In another example, a pointer to the valid bit may be generated by subtracting the sequence number from the head pointer.

Memory unit 418 may also be referred to as a reordering memory. In one example, memory unit 418 includes a circular buffer with a head and tail pointer for each packet sequencer. Each packet descriptor stored in the memory unit 418 in the corresponding circular buffer at an offset equal to the head pointer plus the difference between the sequence number and the head pointer. As described above, each packet sequencer includes a valid bits register where each valid bit is associated with a buffer memory unit 418. Each valid bit indicates whether or not a packet descriptor is stored in the associated buffer in memory unit 418. If only one packet sequencer is enabled, the entire memory space will be used with a single ready and write pointer. If multiple packet sequencers are enabled, then the memory space will be divided up into sections, one section for each packet sequencer. The number of packet sequencers enabled will define the number of memory read and write pointers required.

Figure 16:
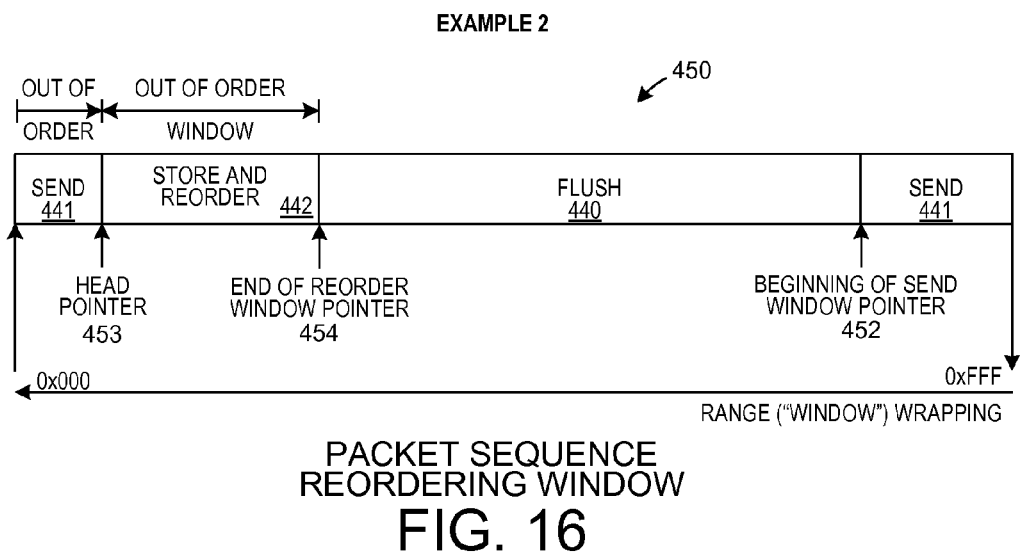
FIG. 16 is a diagram of a second example of a packet sequence reordering window 450.

FIG. 16 is a diagram of a second example of a reordering window 450. This second example is provided to illustrate the wrapping of ranges ("windows") as the head pointer is incremented during operation. Each time the head pointer is incremented, the beginning of send window pointer and the end of reorder window pointer are also incremented. As such, the windows slide across sequence numbers in unison. It is also noted that the ranges ("windows") wrap back to sequence number 1 after reaching the maximum sequence number of the system. For example, reordering window 450 has a maximum sequence number of 4096 and in FIG. 15 the beginning of the send window pointer is at a sequence number that is less than the head pointer. The entire send window comprises consecutive sequence numbers. At another point in time, the beginning of send window pointer is at a sequence number that is greater than the head pointer and the send window comprises a first set of consecutive numbers ending at 4096 and a second consecutive set of sequence numbers starting at 1 and ending at the head pointer minus one. The ranges ("windows") of non-overlapping sequence numbers wrap as the head counter is incremented.

Figure 17:
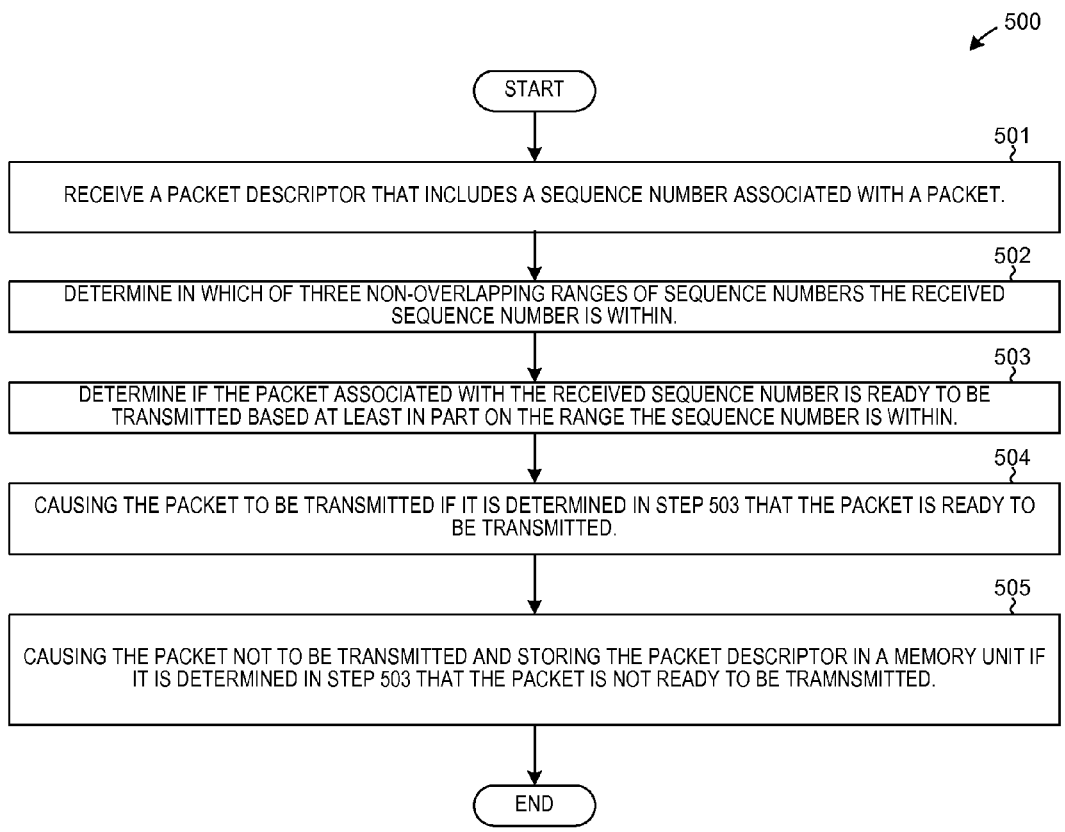
FIG. 17 is a flowchart diagram 500 of an exemplary packet sequence reordering process.

FIG. 17 is a flowchart diagram 500 of an exemplary packet reordering operation. In step 501, a packet descriptor is received. In one example, the packet descriptor is received by the packet reorder block 401. The packet descriptor includes a sequence number associated with a packet. In step 502, it is determined in which of three non-overlapping ranges of sequence numbers the sequence number is within. In one example, the first range is the flush range, the second range is the send range, and the third range is the store and reorder range. In step 503, it is determined if the packet associated with the sequence number is ready to be transmitted based at least in part on the range the sequence number is within. In step 504, the packet associated with the sequence number is sent if it is determined that the packet is ready to be transmitted in step 503. In step 505, the packet associated with the sequence number is not transmitted, but rather stored in a memory unit if it is determined in step 503 that the packet is not ready to be transmitted.

Figure 18:
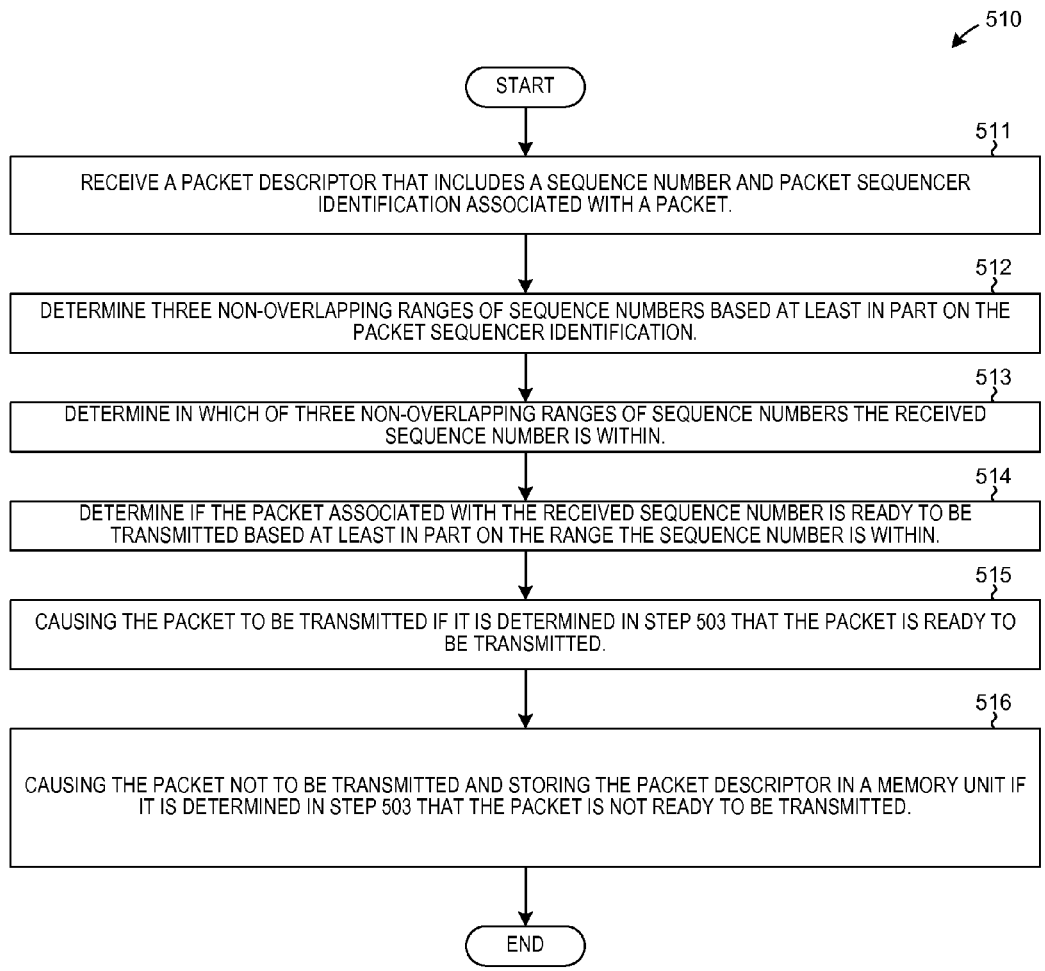
FIG. 18 is a flowchart diagram 510 of an exemplary packet sequence reordering process.

FIG. 18 is a flowchart diagram 510 of an exemplary packet reordering operation. In step 511, a packet descriptor is received. In one example, the packet descriptor is received by the packet reorder block 401. The packet descriptor includes a sequence number and a packet sequencer identification associated with a packet. In step 512, three non-overlapping ranges of sequence numbers are determined based at least in part on the packet sequencer identification. In step 513, it is determined in which of three non-overlapping ranges of sequence numbers the sequence number is within. In one example, the first range is the flush range, the second range is the send range, and the third range is the store and reorder range. In step 514, it is determined if the packet associated with the sequence number is ready to be transmitted based at least in part on the range the sequence number is within. In step 515, the packet associated with the sequence number is transmitted if it is determined that the packet is ready to be transmitted in step 514. In step 516, the packet associated with the sequence number is not transmitted, but rather stored in a memory unit if it is determined in step 514 that the packet is not ready to be transmitted.

Figure 19:
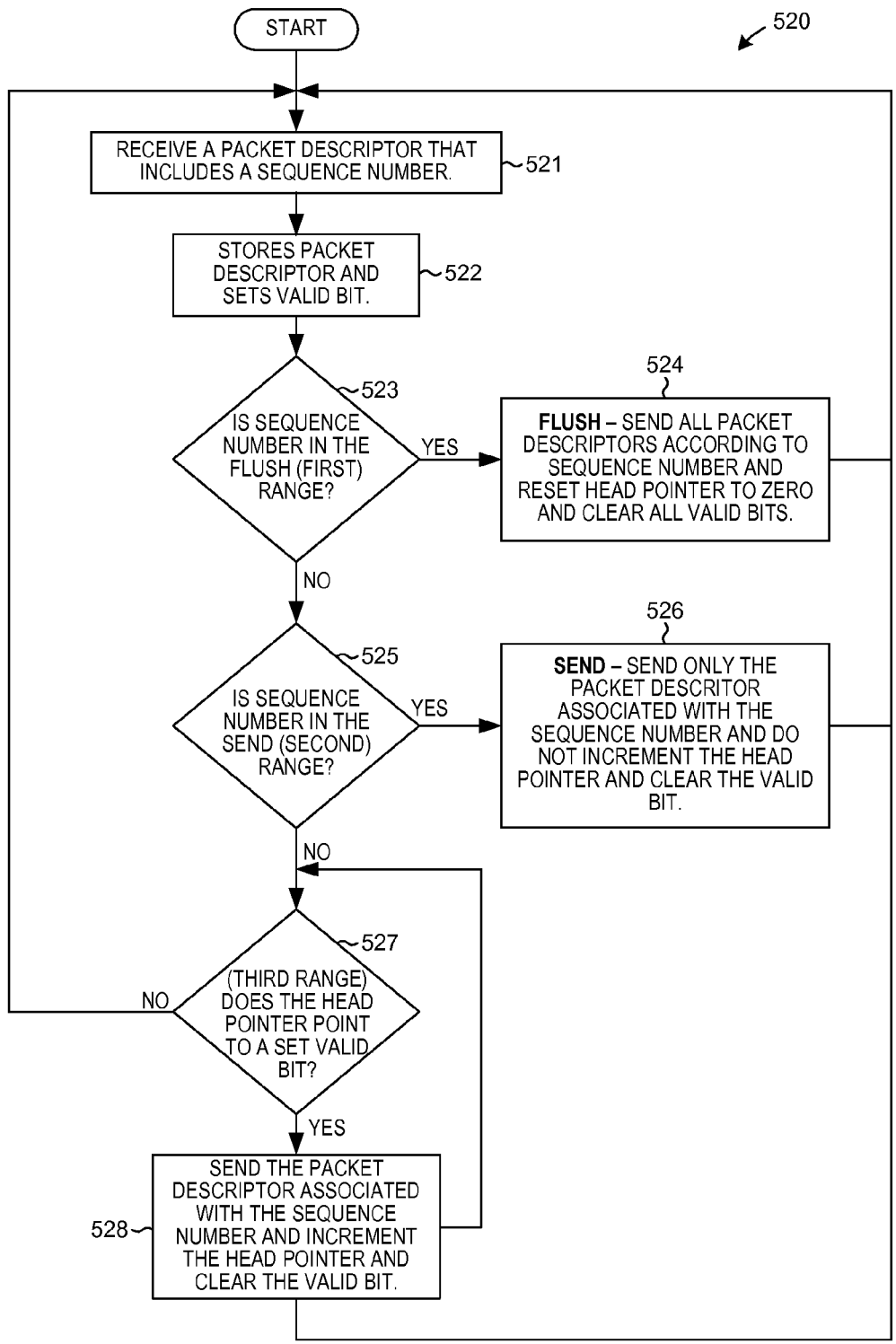
FIG. 19 is a flowchart illustrating a first example of operation of packet sequencer 414.

FIG. 19 is a flowchart 520 illustrating a first example of operation of a packet sequencer (414-416). In step 521, a packet descriptor that includes a sequence number is received. In step 522, the packet descriptor is stored and a valid bit associated with a buffer used to store the packet descriptor is set. In step 523, it is determined if the sequence number is within the flush range. If the sequence number is within the flush region, the packet sequencer: (i) causes all packet descriptors managed by the packet sequencer to be communicated to scheduler 366, (ii) resets the head pointer to zero, and (iii) clears all bits within the valid bits register of the packet sequencer (step 524). If it is determined that the sequence number is not within the flush region, the flow continues to step 525. In step 525, it is determined if the sequence number is in the send range. If the sequence number is within the send range, then the packet sequencer: (i) causes only the packet descriptor received in step 521 to be communicated to scheduler 366, and (ii) clears the valid bit associated with the buffer that as used to store the packet descriptor (step 526). If the sequence number is not within the send range, the flow continues to step 527. In step 527, the packet sequencer determines if the head pointer points to a set valid bit (i.e. the head pointer is equal to the sequence number). If it is determined that the head pointer does point to a set valid bit, the packet sequencer: (i) causes the packet descriptor to be communicated to the scheduler 366, (ii) increments the head pointer, and (iii) clears the valid bit associated with the buffer that was used to store the packet descriptor (step 528). If it is determined that the head pointer does not point to a set valid bit, the packet sequencer returns to step 521.

Figure 20:
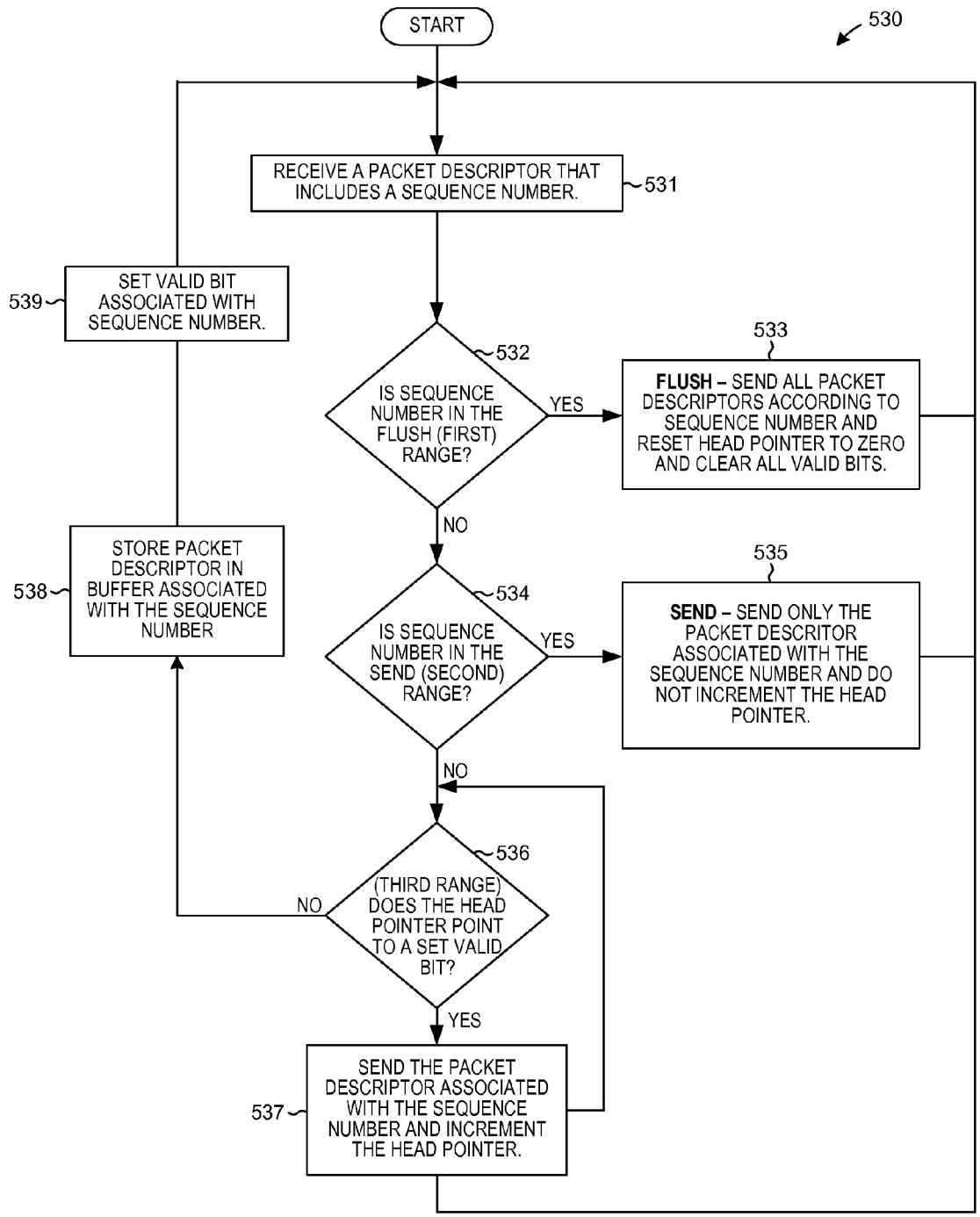
FIG. 20 is a flowchart illustrating a second example of operation of packet sequencer 414.

FIG. 20 is a flowchart 530 illustrating a second example of operation of a packet sequencer (414-416). In step 531, a packet descriptor that includes a sequence number is received. In step 532, it is determined if the sequence number is within the flush range. If the sequence number is within the flush region, the packet sequencer: (i) causes all packet descriptors managed by the packet sequencer to be communicated to scheduler 366, (ii) resets the head pointer to zero, and (iii) clears all bits within the valid bits register of the packet sequencer (step 534). If it is determined that the sequence number is not within the flush region, the flow continues to step 534. In step 534, it is determined if the sequence number is in the send range. If the sequence number is within the send range, then the packet sequencer causes only the packet descriptor received in step 531 to be communicated to scheduler 366 (step 535). If the sequence number is not within the send range, the flow continues to step 536. In step 536, the packet sequencer determines if the head pointer points to a set valid bit (i.e. the head pointer is equal to the sequence number). If it is determined that the head pointer does point to a set valid bit, the packet sequencer: (i) causes the packet descriptor to be communicated to the scheduler 366, and (ii) increments the head pointer (step 537). If it is determined that the head pointer does not point to a set valid bit, the packet descriptor is stored in a buffer associated with the sequence number (step 538). In step 539, a valid bit associated with the sequence number is set. The packet sequencer then returns to step 531.

Figure 21:
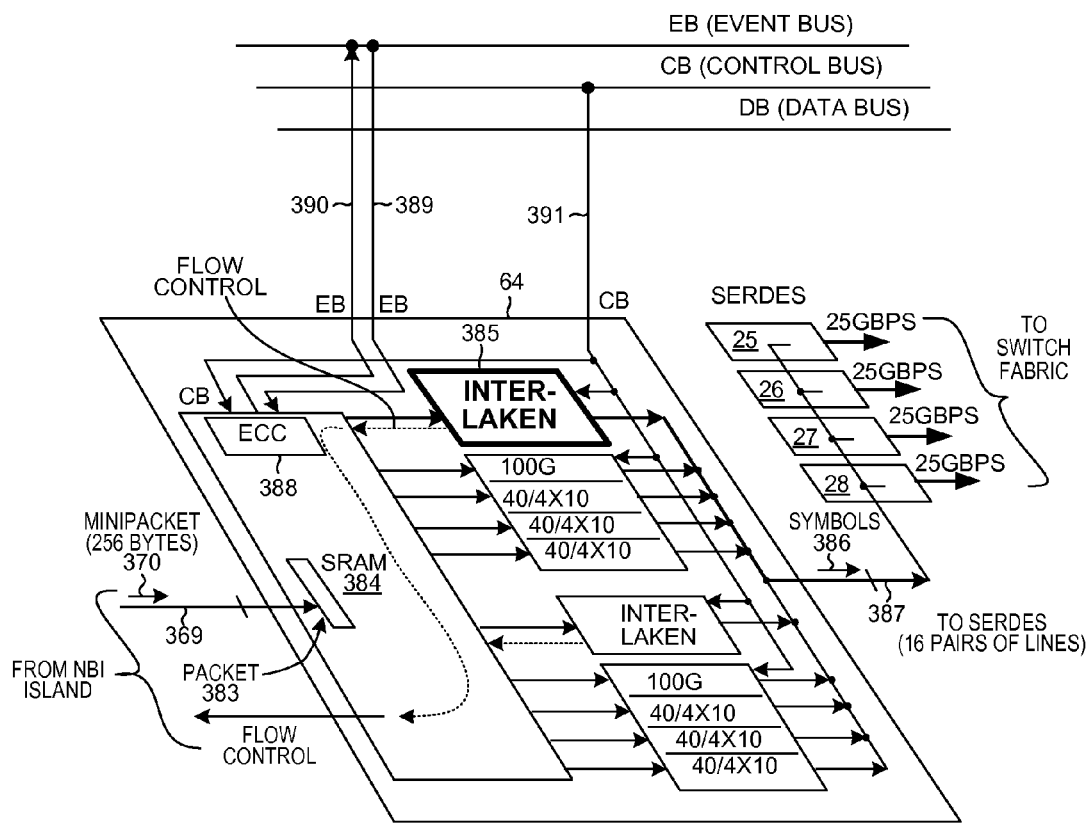
FIG. 21 is a diagram of egress MAC island 64 and SerDes blocks 25-28.

FIG. 21 is a diagram of egress MAC island 64. A packet 383 for transmission are received from egress NBI island 63 in the form of minipackets 370 via dedicated connections 369. The packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1. ECC circuitry 388 of SRAM 384 is made a part of a local event ring via EB connections 389 and 390. Sub-circuits of MAC island are configurable. Configuration information for these sub-circuits is received from the control bus tree via connections 391.

Figure 22:
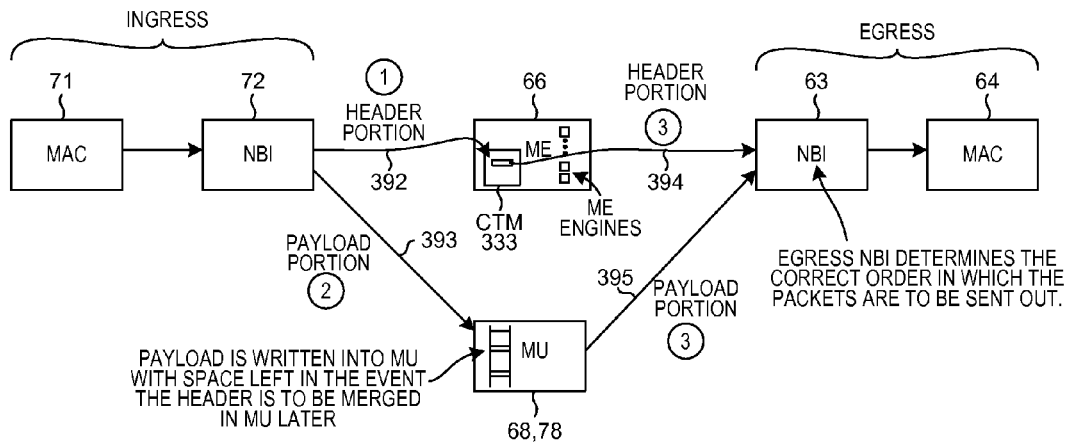
FIG. 22 is a diagram that illustrates a packet flow in the operational example when local memory resources in the CTM 333 of the ME island 66 are determined not to be scarce (for example, the processing resource is determined not to be below a predetermined threshold).

FIG. 22 is a diagram that illustrates a packet flow in the operational example when local memory resources in the CTM 333 of the ME island 66 are determined not to be scarce. An incoming packet passes through the ingress MAC island 71 and the ingress NBI island 72 as described above. Arrow 392 indicates that the header portion is then transferred (Step 1) across the configurable mesh data bus into CTM 333 of ME island 66, whereas arrow 393 indicates that the payload portion of the packet is transferred (Step 2) across the configurable mesh data bus into the MU island 68,78 without being stored in the ME island. The payload portion of each packet is stored in the MU island such that spare memory space is left at the beginning of where the payload is stored. That spare memory space is adequate to accommodate the header portion of the packet without overwriting other packet payloads. In the case of FIG. 22, however, the header portion is never written into the MU island. Microengines of the ME island and hardware engines of the MU island analyze and process the packet. Arrow 394 indicates that the header portion is then transferred (Step 3) from the ME island 66 and to the egress NBI island 63. Arrow 395 indicates that the payload portion is transferred (Step 3) from the MU island 68, 78 to the egress NBI island 63. The same step number is used because these transfers may occur simultaneously. The header portion and the payload portion are combined in the NBI island 63 and then pass through the egress MAC island 64 and the four SerDes I/O blocks and out of the IB-NFP integrated circuit.

Figure 23:
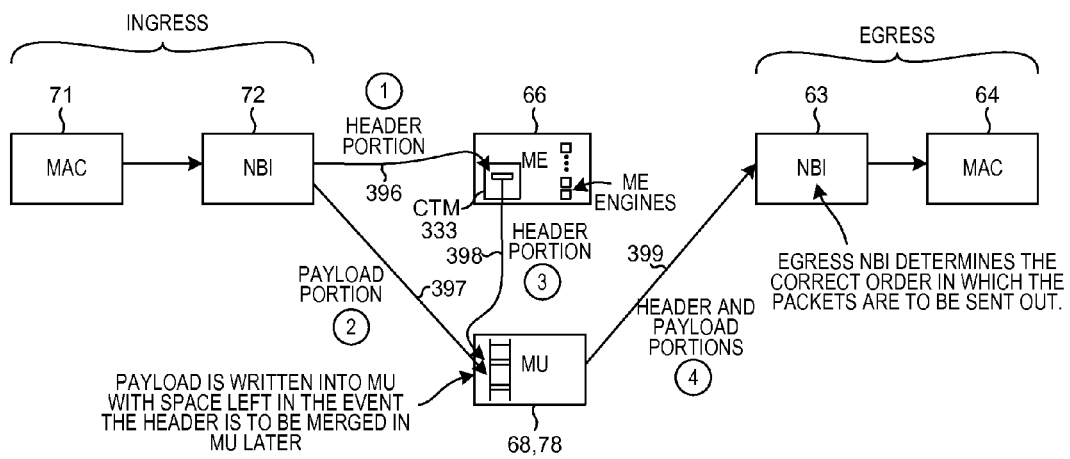
FIG. 23 is a diagram that illustrates a packet flow in the operational example when local memory resources in the CTM 333 of the ME island 66 are determined to be scarce (for example, the processing resource is determined to be below a predetermined threshold).

FIG. 23 is a diagram that illustrates a packet flow in the operational example when local memory resources in the CTM 333 of the ME island 66 are determined to be scarce. An incoming packet passes through the ingress MAC island 71 and the ingress NBI island 72 as described above. As indicated by arrow 396, the header portion is then transferred (Step 1) across the configurable mesh data bus into CTM 333 of ME island 66. Arrow 396 indicates that the payload portion of the packet is transferred (Step 2) across the configurable mesh data bus into the MU island 68, 78 without being stored in the ME island. As in the case described above in connection with FIG. 22, the payload portion of each packet is stored in the MU such that spare memory space exists at the beginning of where the payload is stored. The spare memory space is adequate to accommodate the header portion without overwriting other packet payloads. Based on how long it will take before the packet will be transmitted from the IB-NFP, the egress NBI island 63 determines that the header portion shall be moved from the ME island and to MU island in order to free up resources in the CTM 333 of the ME island. As indicated by arrow 398, the header portion is transferred (Step 3) from the ME island and is stored into the ME island into the spare memory space at the beginning of its associated payload portion. Microengines of the ME island and hardware engines of the MU island analyze and process the packet. The packet may be analyzed before the transfer 398, or after the transfer 398, or both. When the scheduler of the egress NBI island determines that the packet is to be transferred for transmission from the IB-NFP integrated circuit, then the header portion and the payload portion are DMA transferred (Step 4) together directly from the MU island and across the configurable mesh data bus and to the egress NBI island. Arrow 399 indicates this transfer of the packet header and the packet payload. The packet then passes across dedicated connections from the egress NBI island 63 to the egress MAC island 64, and through the four SerDes blocks, and out of the IB-NFP integrated circuit. FIGS. 22 and 23 illustrate a scenario in which the order of packets entering the NFP is different from the order in which the processed packets are output by the NFP. The novel aspects disclosed herein provide an efficient and practical way to guarantee in-order packet delivery by the NFP in spite of variable packet processing durations.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
    (a) receiving a packet descriptor from an ingress island and a sequence number onto an egress island, wherein both the ingress island and the egress island are included in an island based network flow processor;
    (b) storing the packet descriptor in a buffer in a memory unit, wherein the memory unit comprises a plurality of buffers, wherein a register comprises a plurality of valid bits, wherein there is a one-to-one correspondence between the valid bits and the buffers, and wherein a head pointer points to one valid bit in the register;
    (c) setting the valid bit corresponding to the buffer in (b);
    (d) if the sequence number is in a first range then: (i) outputting all packet descriptors stored in the memory unit, and (ii) clearing all valid bits that are associated with the buffers that stored the packet descriptors;
    (e) if the sequence number is in a second range then: (i) outputting the packet descriptor received in (a), and (ii) clearing the valid bit that is associated with the buffer that stored the packet descriptor; and
    (f) if the sequence number is in a third range then: (i) if the head pointer points to a set valid bit then outputting the packet descriptor received in (a), clearing the valid bit associated with the buffer that stored the packet descriptor, incrementing the head pointer, and repeating (f), or (ii) if the head pointer does not point to a set valid bit then returning to (a).

2. The method of claim 1, wherein the packet descriptor and the sequence number are received in (a) into a packet reorder circuit, and wherein the packet descriptor output in (d) is output from the packet reorder circuit.

3. A method, comprising:
    (a) receiving a packet descriptor onto an egress island and a sequence number, wherein the sequence number is one of a plurality of sequence numbers, wherein the egress island is located on an island based network flow processor;

(b) maintaining a plurality of buffers in a memory unit, wherein there is a one-to-one correspondence between the buffers and the sequence numbers;
(c) maintaining a register, wherein the register comprises a plurality of valid bits, wherein there is a one-to-one correspondence between the valid bits and the buffers, and wherein a head pointer points to one valid bit in the register;
(d) if the sequence number is in a first range then: (i) outputting all packet descriptors stored in the memory unit that are associated with the plurality of sequence numbers, and (ii) clearing all valid bits that are associated with the buffers that stored the output packet descriptors;
(e) if the sequence number is in a second range then outputting the packet descriptor received in (a); and
(f) if the sequence number is in a third range then: (i) if the head pointer is equal to the sequence number received in (a) then outputting the packet descriptor received in (a), and incrementing the head pointer, and repeating (f), or (ii) if the head pointer is not equal to the sequence number then storing the packet descriptor in the buffer that corresponds to the sequence number, setting the valid bit that corresponds to the sequence number, and returning to (a).

4. The method of claim 3, wherein the packet descriptor and the sequence number are received in (a) into a packet reorder circuit, and wherein the packet descriptor output in (d) is output from the packet reorder circuit.

5. A circuit, comprising:
a packet reorder block that receives a packet descriptor from an ingress island and a sequence number, wherein the packet reoarder block is located on an egress island, wherein both the ingress island and the egress island are included in an island based network flow processor,
a memory unit that comprises a plurality of buffers; and
a scheduler block that receives the packet descriptor from the packet reorder block when the packet reorder block determines that the packet descriptor is ready to be output, wherein the packet reorder block determines if the packet descriptor is ready to be output based on the sequence number, wherein the packet reorder block further comprises:
a decoder that receives a transmit packet command and in response generates configuration data;
a valid bits register comprising a plurality of valid bits, wherein each valid bit has a one-to-one correspondence to one buffer in the memory unit, and wherein a head pointer points to one valid bit;
a first packet sequencer that (i) receives the configuration data from the decoder and in response determines a first, a second, and a third range of non-overlapping sequence numbers, (ii) receives the first packet descriptor; and (iii) determines if the packet descriptor is ready to be output; and
a memory access unit that receives requests from the first packet sequencer.

6. The circuit of claim 5, wherein if the sequence number is in the first range of non-overlapping sequence numbers, the packet sequencer: (i) outputs all packet descriptors stored in buffers that are associated with the valid bits register to the scheduler block, (ii) clears all valid bits in the valid bits register, and (iii) resets the head pointer.

7. The circuit of claim 5, wherein if the sequence number is in the second range of non-overlapping sequence numbers, the packet sequencer: (i) outputs the packet descriptor to the scheduler block, and (ii) clears the valid bit.

8. The circuit of claim 5, wherein if the sequence number is in the third range of non-overlapping sequence numbers and the head pointer is equal to the sequence number, the packet sequencer: (i) outputs the packet descriptor to the scheduler block, and (ii) increments the head pointer.

9. The circuit of claim 5, wherein if the sequence number is in the third range of non-overlapping sequence numbers and the head pointer is not equal to the sequence number, the packet sequencer communicates a memory request to the memory access unit that causes the memory access unit to store the packet descriptor in a buffer in the memory unit.

10. The circuit of claim 5, wherein the packet reorder block further comprises a second packet sequencer, wherein the packet reorder block also receives a packet sequencer identification, wherein if the packet sequencer identification is a first value, the first packet sequencer processes the packet descriptor, and wherein if the packet sequencer identification is a second value, the second packet sequencer processes the packet descriptor.

11. The circuit of claim 10, wherein the first packet sequencer compares received sequence numbers with a first, a second, and a third range of non-overlapping sequence numbers, and wherein the second packet sequencer compares received sequence numbers with a the first, a the second, and a the third range of non-overlapping sequence numbers.

12. The circuit of claim 5, wherein upon receiving the packet descriptor from the packet reorder block, the scheduler block causes a packet associated with the packet descriptor to be transmitted.

13. The circuit of claim 5, wherein the packet reorder block further comprises an out of order counter that stores an out of order value, wherein the first packet sequencer increments the out of order value if the sequence number is in the first or second range of non-overlapping sequence numbers, and wherein the circuit operates to ensure that packets are transmitted in the same order as received.

14. A method, comprising:
(a) receiving onto an egress island a first packet descriptor from an ingress island that includes a sequence number associated with a first packet wherein both the ingress island and the egress island are included in an island based network flow processor;
(b) determining in which of three non-overlapping ranges of sequence numbers the first sequence number is in;
(c) determining if the first packet descriptor is ready to be output based at least in part on determination in (b);
(d) if it is determined in (c) that the first packet descriptor is ready to be output, then causing the first packet descriptor to be output; and
(e) if it is determined in (b) that the first packet is not ready to be sent, then: (i) causing the first packet descriptor to not be output, (ii) setting the valid bit, and (iii) storing the first packet descriptor in a memory unit, wherein the valid bit is stored in a register, and wherein there is a one-to-one correspondence between the valid bit and a buffer in the memory unit where the packet descriptor is stored.

15. The method of claim 14, further comprising:
(a1) generating configuration data in response to the receiving a transmit packet command; and
(a2) determining a first, a second, and a third non-overlapping range of sequence numbers based on the configuration data.

16. The method of claim 14, wherein when it is determined in (b) that the sequence number is within a first range of non-overlapping sequence numbers, all packet descriptors stored in buffers that are associated with the register are determined to be ready to be output in (c).

17. The method of claim 14, wherein when it is determined in (b) that the sequence number is within a second range of non-overlapping sequence numbers, only the first packet descriptor is determined to be ready to be output in (c).

18. The method of claim 14, wherein when it is determined in (b) that the sequence number is within a third range of non-overlapping sequence numbers, the method further comprises:
   (c1) determining that the first packet descriptor is ready to be output when the sequence number is equal to a head pointer that points to the valid bit; and
   (d1) incrementing the head pointer.

19. The method of claim 14, wherein when it is determined in (b) that the sequence number is within a third range of non-overlapping sequence numbers, the method further comprises:
   (c1) determining that the first packet descriptor is not ready to be output when the sequence number is not equal to the head pointer.

20. The method of claim 14, wherein the first packet descriptor further includes a packet sequencer identification, the method further comprising:
   (a1) determining if the packet sequencer identification is a first value or a second value;
   (a2) if the packet sequencer identification is the first value, then utilizing a first packet sequencer to perform steps (a) through (e); and
   (a3) if the packet sequencer identification is the second value, then utilizing a second packet sequencer to perform steps (a) through (e), wherein the first packet sequencer uses a first set of buffers within the memory unit to store packet descriptors, and wherein the second packet sequencer uses a second set of buffers within the memory unit to store packet descriptors.

21. The method of claim 14, wherein the packet descriptor is output from a memory access unit to a scheduler block in response from receiving a request from a packet sequencer, and wherein the scheduler block causes a packet associated with the packet descriptor to be transmitted.

* * * * *